United States Patent
Stefanich

(10) Patent No.: US 12,335,248 B2
(45) Date of Patent: Jun. 17, 2025

(54) METHODS AND SYSTEMS FOR MANAGING HEALTH DATA USING A BLOCKCHAIN-BASED DISTRIBUTED LEDGER

(71) Applicant: RYMEDI, INC., Greenville, SC (US)

(72) Inventor: David R. Stefanich, Greenville, SC (US)

(73) Assignee: RYMEDI, INC., Greenville, SC (US)

( * ) Notice: Subject to any disclaimer, the term of this patent is extended or adjusted under 35 U.S.C. 154(b) by 0 days.

(21) Appl. No.: 18/662,415

(22) Filed: May 13, 2024

(65) Prior Publication Data

US 2024/0380739 A1 Nov. 14, 2024

Related U.S. Application Data

(60) Provisional application No. 63/584,286, filed on Sep. 21, 2023, provisional application No. 63/584,261, filed on Sep. 21, 2023, provisional application No. 63/584,275, filed on Sep. 21, 2023, provisional application No. 63/466,096, filed on May 12, 2023.

(51) Int. Cl.
*H04L 9/40* (2022.01)
*H04L 9/08* (2006.01)

(52) U.S. Cl.
CPC ........ *H04L 63/0485* (2013.01); *H04L 9/0827* (2013.01)

(58) Field of Classification Search
USPC ........................................................ 713/160
See application file for complete search history.

(56) References Cited

U.S. PATENT DOCUMENTS 9,576,147 B1 2/2017 McClintock et al.
9,794,289 B1 10/2017 Banerjee et al.
(Continued)

FOREIGN PATENT DOCUMENTS

| EP | 3591549 A1 * | 1/2020 | ............ G06F 21/10 |
| WO | WO-2019055507 A1 * | 3/2019 | ............ B33Y 10/00 |
| WO | 2020252050 A1 | 12/2020 | |
| WO | 2023281446 A1 | 1/2023 | |

OTHER PUBLICATIONS

L. Ding and M. Ben Salem, "A Novel Architecture for Automatic Document Classification for Effective Security in Edge Computing Environments," 2018 IEEE/ACM Symposium on Edge Computing (SEC), Seattle, WA, USA, 2018, pp. 416-420, doi: 10.1109/SEC .2018.00056. (Year: 2018).
Written Opinion of the International Search Report dated Oct. 17, 2024.

*Primary Examiner* — Sakinah White Taylor
(74) *Attorney, Agent, or Firm* — Bryan L. Baysinger; Thomas R. Parker; Maynard Nexsen PC

(57) ABSTRACT

The present disclosure generally relates to methods, systems, apparatuses, and non-transitory computer readable media for managing health data. A method includes receiving a first data packet associated with a first user. The first data packet is assigned a universally unique identifier based on the first user. The method also includes causing an encryption of the first data packet. The method further includes storing at least one of the plurality of encryption keys on a first distributed ledger subnet. The method still further includes receiving the at least one of the plurality of encryption keys for the encrypted first data packet stored on the first distributed ledger subnet. The method also includes causing a decryption of the first data packet based on the at least one of the plurality of encryption keys for the encrypted first data packet stored on the first distributed ledger subnet.

20 Claims, 12 Drawing Sheets

(56) References Cited

U.S. PATENT DOCUMENTS

| | | |
|---|---|---|
| 10,404,757 B1 | 9/2019 | Horton |
| 11,336,461 B2 | 5/2022 | Maunier et al. |
| 2006/0004847 A1 | 1/2006 | Claudatos et al. |
| 2008/0184329 A1 | 7/2008 | Cross et al. |
| 2009/0254971 A1 | 10/2009 | Herz et al. |
| 2011/0145593 A1 | 6/2011 | Auradkar et al. |
| 2014/0380404 A1 | 12/2014 | Raj et al. |
| 2015/0187353 A1 | 7/2015 | Yan et al. |
| 2016/0359915 A1 | 12/2016 | Gupta et al. |
| 2017/0364302 A1 | 12/2017 | Atherton et al. |
| 2018/0241813 A1 | 8/2018 | Funk |
| 2019/0207981 A1 | 7/2019 | Sweeney et al. |
| 2019/0268340 A1 | 8/2019 | Decouteau et al. |
| 2020/0186358 A1* | 6/2020 | Capola .................. H04L 9/3228 |
| 2020/0210613 A1 | 7/2020 | Carrier |
| 2020/0296102 A1 | 9/2020 | Buchner et al. |
| 2020/0364605 A1 | 11/2020 | Gorham et al. |
| 2021/0034264 A1 | 2/2021 | Ali et al. |
| 2021/0083843 A1 | 3/2021 | Salomon et al. |
| 2021/0133350 A1 | 5/2021 | Kirti et al. |
| 2021/0344485 A1 | 11/2021 | Levin et al. |
| 2021/0357392 A1 | 11/2021 | Bulut et al. |
| 2022/0166625 A1 | 5/2022 | Stefanich |
| 2023/0043229 A1* | 2/2023 | Tola ..................... H04L 9/0841 |
| 2023/0048167 A1 | 2/2023 | Gai et al. |
| 2023/0130024 A1 | 4/2023 | Megregor et al. |
| 2023/0147097 A1 | 5/2023 | Jongpaiboonkit |
| 2024/0135364 A1 | 4/2024 | Agudelo et al. |

\* cited by examiner

METHODS AND SYSTEMS FOR MANAGING HEALTH DATA USING A BLOCKCHAIN-BASED DISTRIBUTED LEDGER

CROSS-REFERENCE TO RELATED APPLICATION

This application claims the benefit of priority to U.S. Provisional Patent Application No. 63/466,096 filed May 12, 2023 and titled "METHODS AND SYSTEMS FOR MANAGING HEALTH DATA USING A BLOCKCHAIN-BASED DISTRIBUTED LEDGER"; U.S. Provisional Patent Application No. 63/584,261 filed Sep. 21, 2023 and titled "SYSTEMS AND METHODS OF DEPLOYING A CIPHER FOR COMPLIANCE TRANSACTIONS"; U.S. Provisional Patent Application No. 63/584,275 filed Sep. 21, 2023 and titled "CRYPTOGRAPHIC CIPHER FOR THE SEGMENTATION OF PERSONAL IDENTIFYING INFORMATION, PROTECTED HEALTH INFORMATION, AND PLATFORM PERMISSIONING"; and U.S. Provisional Patent Application No. 63/584,286 filed Sep. 21, 2023 and titled "CRYPTOGRAPHIC CIPHER FOR RETRIEVAL OF PERSONAL IDENTIFYING INFORMATION, PROTECTED HEALTH INFORMATION, AND PLATFORM." The contents of the above applications are incorporated by reference in their entirety.

FIELD

The present disclosure generally relates to managing health data, and more particularly, to managing heath data using distributed ledgers.

BACKGROUND

Today's health data management compliance involves the imposition of technical and human processes to control access to, and validate information on, databases and data lakes without inherent controls. Government regulations and industry standards across jurisdictions have various requirements for health data security, integrity, privacy, permissioned access, record keeping and the verifiability of these compliance practices. Health data compliance practices across health and life sciences industries are onerous, costly, and prone to human error because of the imposition of control processes onto data systems that do not inherently have those controls. Consequently, the difficulty and costs of health data compliance, as well as high liabilities around improper compliance, together maintain high barriers to implementing data driven solutions across organizations and data systems, making siloed data sets the norm, and limiting the value of that data to the organization or use case through which it was generated. The value of interoperability and data exchange efforts are themselves limited by the difficulty, cost, and error-prone compliance practices where data is generated to varying levels of stringency and quality.

Therefore, a need exists for health data storage and management technology designed to automate health data compliance in the very architecture of its operations, simplifying compliance, reducing compliance costs, and enabling higher levels of health data compliance across varieties of use cases than is typically the norm. A health data compliance architecture that inherently controls data use and access, and provides simple verification, will also increase the value unlocked by interoperability and data exchange efforts, as well as analytics and AI initiatives leveraging data from varieties of health organizations and use cases.

BRIEF SUMMARY

Embodiments of the present disclosure address and overcome one or more of the shortcomings and drawbacks of existing systems by building in heightened data access controls, traceability, and deidentification at the data architecture foundation via public key cryptography and separate storage of identity and digital transaction content with compliance authentication hashed onto a permissionless distributed ledger, and granting fine-tuned data access and use permissions on a need-to-know/need-to-use basis via allocation of cryptographic keys. These embodiments provide security, integrity, privacy, permissioned access, and record keeping to the highest regulations and standards applicable to any health data use for any digital transaction in software, firmware, and hardware. Additionally, compliance authentication inherent to the architecture and cryptography simplifies verification of health data compliance by permissioned parties.

In some aspects, the techniques described herein relate to a system for managing health data, including: at least one non-transitory storage device; and at least one processing device coupled to the at least one non-transitory storage device, wherein the at least one processing device is configured to: receive a first data packet associated with a first user, wherein the first data packet is assigned a universally unique identifier based on the first user; cause an encryption of the first data packet using a plurality of encryption keys, wherein at least one of the plurality of encryption keys is based on the universally unique identifier; store at least one of the plurality of encryption keys for the encrypted first data packet on a first distributed ledger subnet, wherein the first distributed ledger subnet is determined based on a data type of the first data packet; receive the at least one of the plurality of encryption keys for the encrypted first data packet stored on the first distributed ledger subnet; and cause a decryption of the first data packet based on the at least one of the plurality of encryption keys for the encrypted first data packet stored on the first distributed ledger subnet.

In some aspects, the techniques described herein relate to a system, wherein the first distributed ledger subnet is one of a PII subnet, a PHI subnet, or a platform subnet.

In some aspects, the techniques described herein relate to a system, further including a plurality of distributed ledger subnets, wherein the first distributed ledger subnet is determined from the plurality of distributed ledger subnets.

In some aspects, the techniques described herein relate to a system, wherein each of the plurality of distributed ledger subnets contains information relating to a different data type.

In some aspects, the techniques described herein relate to a system, wherein the at least one processing device is further configured to determine the data type for the first data packet based on the first data packet.

In some aspects, the techniques described herein relate to a system, wherein the at least one processing device is further configured to determine the first distributed ledger subnet based on the data type of the first data packet.

In some aspects, the techniques described herein relate to a system, wherein the at least one processing device is further configured to generate the universally unique identifier based on the first user.

In some aspects, the techniques described herein relate to a system, wherein the at least one processing device is further configured to store the encrypted first data packet in a data management database.

In some aspects, the techniques described herein relate to a system, wherein the at least one processing device is further configured to: receive a second data packet associated with the first user; cause an encryption of the second data packet using the plurality of encryption keys, wherein at least one of the plurality of encryption keys is based on the universally unique identifier; and store at least one of the plurality of encryption keys for the encrypted second data packet on a second distributed ledger subnet, wherein the second distributed ledger subnet is determined based on a data type of the second data packet.

In some aspects, the techniques described herein relate to a system, wherein the at least one processing device is further configured to: receive the at least one of the plurality of encryption keys for the encrypted second data packet stored on the second distributed ledger subnet; and cause a decryption of the second data packet based on the at least one of the plurality of encryption keys for the encrypted second data packet stored on the second distributed ledger subnet.

In some aspects, the techniques described herein relate to a system, wherein the at least one processing device is further configured to: receive a second data packet associated with a second user, wherein the second data packet is assigned a universally unique identifier based on the second user; cause an encryption of the second data packet using a plurality of encryption keys, wherein at least one of the plurality of encryption keys is based on the universally unique identifier based on the second user; and store at least one of the plurality of encryption keys for the encrypted second data packet on the first distributed ledger subnet, wherein the first distributed ledger subnet is determined based on a data type of the second data packet, wherein the second data packet shares the data type with the first data packet.

In some aspects, the techniques described herein relate to a system, wherein the at least one processing device is further configured to: receive the at least one of the plurality of encryption keys for the encrypted second data packet stored on the first distributed ledger subnet; and cause a decryption of the second data packet based on the at least one of the plurality of encryption keys for the encrypted second data packet stored on the first distributed ledger subnet.

In some aspects, the techniques described herein relate to a system, wherein the at least one processing device is further configured to generate each of a plurality of distributed ledger subnets, wherein each of the plurality of distributed ledger subnet are dedicated to a specific data type.

In some aspects, the techniques described herein relate to a system, wherein the at least one processing device is further configured to cause a transmission of the decrypted first data packet to a computing device associated with an entity.

In some aspects, the techniques described herein relate to a system, wherein the at least one processing device is further configured to receive a request for the first data packet associated with the first user.

In some aspects, the techniques described herein relate to a system, wherein the request for the first data packet associated with the first user is approved by the first user.

In some aspects, the techniques described herein relate to a system, wherein the at least one of the plurality of encryption keys for the encrypted first data packet stored on the first distributed ledger subnet is stored as a node on the first distributed ledger subnet.

In some aspects, the techniques described herein relate to a system, wherein the at least one of the plurality of encryption keys for the encrypted first data packet stored on the first distributed ledger subnet is the universally unique identifier based on the first user.

In some aspects, the techniques described herein relate to a system, wherein the universally unique identifier based on the first user is combined with each of the plurality of encryption keys to generate a decryption key.

In some aspects, the techniques described herein relate to a system, wherein a transaction identifier is generated for the first data packet, wherein the transaction identifier is stored on the first distributed ledger subnet.

In some aspects, the techniques described herein relate to a method for managing health data, including: receiving a first data packet associated with a first user, wherein the first data packet is assigned a universally unique identifier based on the first user; causing an encryption of the first data packet using a plurality of encryption keys, wherein at least one of the plurality of encryption keys is based on the universally unique identifier; storing at least one of the plurality of encryption keys for the encrypted first data packet on a first distributed ledger subnet, wherein the first distributed ledger subnet is determined based on a data type of the first data packet; receiving the at least one of the plurality of encryption keys for the encrypted first data packet stored on the first distributed ledger subnet; and causing a decryption of the first data packet based on the at least one of the plurality of encryption keys for the encrypted first data packet stored on the first distributed ledger subnet.

In some aspects, the techniques described herein relate to a method, wherein the first distributed ledger subnet is one of a PII subnet, a PHI subnet, or a platform subnet.

In some aspects, the techniques described herein relate to a method, wherein the first distributed ledger subnet is determined from a plurality of distributed ledger subnets.

In some aspects, the techniques described herein relate to a method, wherein each of the plurality of distributed ledger subnets contains information relating to a different data type.

In some aspects, the techniques described herein relate to a method, further including determining the data type for the first data packet based on the first data packet.

In some aspects, the techniques described herein relate to a method, further including determining the first distributed ledger subnet based on the data type of the first data packet.

In some aspects, the techniques described herein relate to a method, further including generating the universally unique identifier based on the first user.

In some aspects, the techniques described herein relate to a method, further including storing the encrypted first data packet in a data management database.

In some aspects, the techniques described herein relate to a method, further including: receiving a second data packet associated with the first user; causing an encryption of the second data packet using the plurality of encryption keys, wherein at least one of the plurality of encryption keys is based on the universally unique identifier; and storing at least one of the plurality of encryption keys for the encrypted second data packet on a second distributed ledger subnet, wherein the second distributed ledger subnet is determined based on a data type of the second data packet.

In some aspects, the techniques described herein relate to a method, further including: receiving the at least one of the plurality of encryption keys for the encrypted second data packet stored on the second distributed ledger subnet; and causing a decryption of the second data packet based on the at least one of the plurality of encryption keys for the encrypted second data packet stored on the second distributed ledger subnet.

In some aspects, the techniques described herein relate to a method, further including: receiving a second data packet associated with a second user, wherein the second data packet is assigned a universally unique identifier based on the second user; causing an encryption of the second data packet using a plurality of encryption keys, wherein at least one of the plurality of encryption keys is based on the universally unique identifier based on the second user; and storing at least one of the plurality of encryption keys for the encrypted second data packet on the first distributed ledger subnet, wherein the first distributed ledger subnet is determined based on a data type of the second data packet, wherein the second data packet shares the data type with the first data packet.

In some aspects, the techniques described herein relate to a method, further including: receiving the at least one of the plurality of encryption keys for the encrypted second data packet stored on the first distributed ledger subnet; and causing a decryption of the second data packet based on the at least one of the plurality of encryption keys for the encrypted second data packet stored on the first distributed ledger subnet.

In some aspects, the techniques described herein relate to a method, wherein the at least one processing device is further configured to generate each of a plurality of distributed ledger subnets, wherein each of the plurality of distributed ledger subnet are dedicated to a specific data type.

In some aspects, the techniques described herein relate to a method, further including causing a transmission of the decrypted first data packet to a computing device associated with an entity.

In some aspects, the techniques described herein relate to a method, further including receiving a request for the first data packet associated with the first user.

In some aspects, the techniques described herein relate to a method, wherein the request for the first data packet associated with the first user is approved by the first user.

In some aspects, the techniques described herein relate to a method, wherein the at least one of the plurality of encryption keys for the encrypted first data packet stored on the first distributed ledger subnet is stored as a node on the first distributed ledger subnet.

In some aspects, the techniques described herein relate to a method, wherein the at least one of the plurality of encryption keys for the encrypted first data packet stored on the first distributed ledger subnet is the universally unique identifier based on the first user.

In some aspects, the techniques described herein relate to a method, wherein the universally unique identifier based on the first user is combined with each of the plurality of encryption keys to generate a decryption key.

In some aspects, the techniques described herein relate to a method, wherein a transaction identifier is generated for the first data packet, wherein the transaction identifier is stored on the first distributed ledger subnet.

In some aspects, the techniques described herein relate to a computer program product for managing health data, the computer program product including at least one non-transitory computer-readable medium having one or more computer-readable program code portions embodied therein, the one or more computer-readable program code portions including at least one executable portion configured to: receive a first data packet associated with a first user, wherein the first data packet is assigned a universally unique identifier based on the first user; cause an encryption of the first data packet using a plurality of encryption keys, wherein at least one of the plurality of encryption keys is based on the universally unique identifier; store at least one of the plurality of encryption keys for the encrypted first data packet on a first distributed ledger subnet, wherein the first distributed ledger subnet is determined based on a data type of the first data packet; receive the at least one of the plurality of encryption keys for the encrypted first data packet stored on the first distributed ledger subnet; and cause a decryption of the first data packet based on the at least one of the plurality of encryption keys for the encrypted first data packet stored on the first distributed ledger subnet.

In some aspects, the techniques described herein relate to a computer program product, wherein the first distributed ledger subnet is one of a PII subnet, a PHI subnet, or a platform subnet.

In some aspects, the techniques described herein relate to a computer program product, wherein the first distributed ledger subnet is determined from the plurality of distributed ledger subnets.

In some aspects, the techniques described herein relate to a computer program product, wherein each of the plurality of distributed ledger subnets contains information relating to a different data type.

In some aspects, the techniques described herein relate to a computer program product, wherein the one or more computer-readable program code portions include at least one executable portion further configured to determine the data type for the first data packet based on the first data packet.

In some aspects, the techniques described herein relate to a computer program product, wherein the one or more computer-readable program code portions include at least one executable portion further configured to determine the first distributed ledger subnet based on the data type of the first data packet.

In some aspects, the techniques described herein relate to a computer program product, wherein the one or more computer-readable program code portions include at least one executable portion further configured to generate the universally unique identifier based on the first user.

In some aspects, the techniques described herein relate to a computer program product, wherein the one or more computer-readable program code portions include at least one executable portion further configured to store the encrypted first data packet in a data management database.

In some aspects, the techniques described herein relate to a computer program product, wherein the one or more computer-readable program code portions include at least one executable portion further configured to: receive a second data packet associated with the first user; cause an encryption of the second data packet using the plurality of encryption keys, wherein at least one of the plurality of encryption keys is based on the universally unique identifier; and store at least one of the plurality of encryption keys for the encrypted second data packet on a second distributed ledger subnet, wherein the second distributed ledger subnet is determined based on a data type of the second data packet.

In some aspects, the techniques described herein relate to a computer program product, wherein the one or more computer-readable program code portions include at least one executable portion further configured to: receive the at least one of the plurality of encryption keys for the encrypted second data packet stored on the second distributed ledger subnet; and cause a decryption of the second data packet based on the at least one of the plurality of encryption keys for the encrypted second data packet stored on the second distributed ledger subnet.

In some aspects, the techniques described herein relate to a computer program product, wherein the one or more computer-readable program code portions include at least one executable portion further configured to: receive a second data packet associated with a second user, wherein the second data packet is assigned a universally unique identifier based on the second user; cause an encryption of the second data packet using a plurality of encryption keys, wherein at least one of the plurality of encryption keys is based on the universally unique identifier based on the second user; and store at least one of the plurality of encryption keys for the encrypted second data packet on the first distributed ledger subnet, wherein the first distributed ledger subnet is determined based on a data type of the second data packet, wherein the second data packet shares the data type with the first data packet.

In some aspects, the techniques described herein relate to a computer program product, wherein the one or more computer-readable program code portions include at least one executable portion further configured to: receive the at least one of the plurality of encryption keys for the encrypted second data packet stored on the first distributed ledger subnet; and cause a decryption of the second data packet based on the at least one of the plurality of encryption keys for the encrypted second data packet stored on the first distributed ledger subnet.

In some aspects, the techniques described herein relate to a computer program product, wherein the one or more computer-readable program code portions include at least one executable portion further configured to generate each of a plurality of distributed ledger subnets, wherein each of the plurality of distributed ledger subnet are dedicated to a specific data type.

In some aspects, the techniques described herein relate to a computer program product, wherein the one or more computer-readable program code portions include at least one executable portion further configured to cause a transmission of the decrypted first data packet to a computing device associated with an entity.

In some aspects, the techniques described herein relate to a computer program product, wherein the one or more computer-readable program code portions include at least one executable portion further configured to receive a request for the first data packet associated with the first user.

In some aspects, the techniques described herein relate to a computer program product, wherein the request for the first data packet associated with the first user is approved by the first user.

In some aspects, the techniques described herein relate to a computer program product, wherein the at least one of the plurality of encryption keys for the encrypted first data packet stored on the first distributed ledger subnet is stored as a node on the first distributed ledger subnet.

In some aspects, the techniques described herein relate to a computer program product, wherein the at least one of the plurality of encryption keys for the encrypted first data packet stored on the first distributed ledger subnet is the universally unique identifier based on the first user.

In some aspects, the techniques described herein relate to a computer program product, wherein the universally unique identifier based on the first user is combined with each of the plurality of encryption keys to generate a decryption key.

In some aspects, the techniques described herein relate to a computer program product, wherein a transaction identifier is generated for the first data packet, wherein the transaction identifier is stored on the first distributed ledger subnet.

In some embodiments, the architecture and software mechanism utilizes three distributed, encrypted database networks to separately store identity, digital transaction content and compliance authentication data, together with three types of cryptographic keys corresponding to each network that are combined via governing algorithms to produce digital transactions with only the subset of information from each identity and digital transaction content network permissioned for that transaction via two cryptographic keys linked to each network and compliance authentication provided via the third key linked to the compliance authentication network.

In other embodiments, the identity and digital transaction content networks are distributed across permissionless distributed ledger technologies, permissioned distributed ledgers, various kinds of cloud and on-premises database server networks, and edge compute storage on specific devices or edge networks.

The above presents a simplified summary to provide a basic understanding of some aspects of the claimed subject matter. This summary is not an extensive overview. It is not intended to identify key or critical elements or to delineate the scope of the claimed subject matter. Its sole purpose is to present some concepts in a simplified form as a prelude to the more detailed description that is presented later.

BRIEF DESCRIPTION OF THE DRAWINGS

The disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Figure 1:
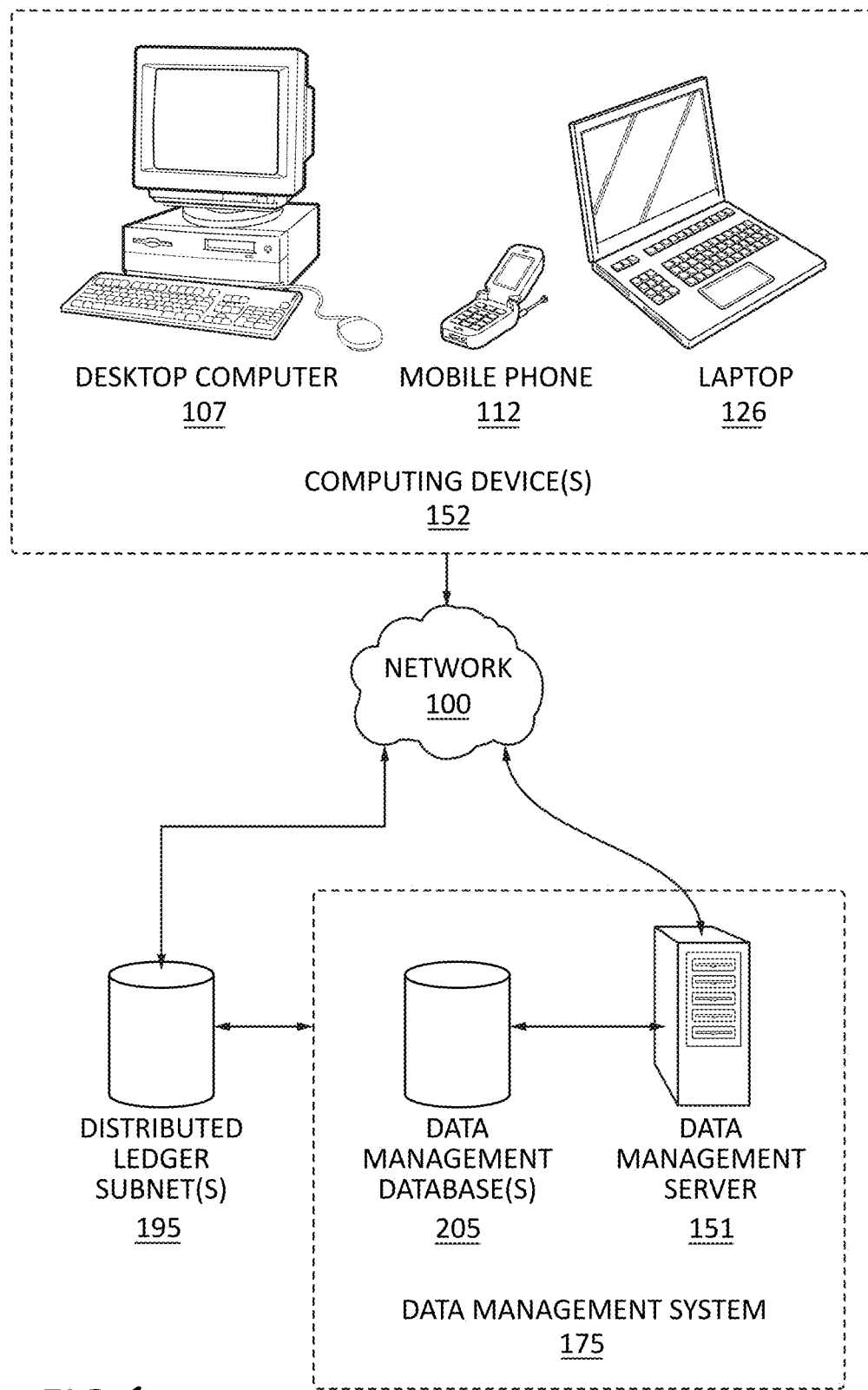
FIG. 1 provides a block diagram illustrating a system environment for data managing healthcare data using a distributed ledger, in accordance with various embodiments of the present disclosure.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims. Particular aspects of the present disclosure are described in greater detail below. The terms and definitions provided herein control, if in conflict with terms and/or definitions incorporated by reference.

The presently disclosed subject matter now will be described more fully hereinafter with reference to the accompanying drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements.

Indeed, many modifications and other embodiments of the presently disclosed subject matter set forth herein will come to mind to one skilled in the art to which the presently disclosed subject matter pertains having the benefit of the teachings presented in the foregoing descriptions and the associated drawings. Therefore, it is to be understood that the presently disclosed subject matter is not to be limited to the specific embodiments disclosed and that modifications and other embodiments are intended to be included within the scope of the appended claims.

Throughout this specification and the claims, the terms "comprise," "comprises", and "comprising" are used in a non-exclusive sense, except where the context requires otherwise. Likewise, the term "includes" and its grammatical variants are intended to be non-limiting, such that recitation of items in a list is not to the exclusion of other like items that can be substituted or added to the listed items.

The following applications are hereby incorporated by reference: U.S. Provisional Patent Application No. 63/466,096 filed May 12, 2023 and titled "METHODS AND SYSTEMS FOR MANAGING HEALTH DATA USING A BLOCKCHAIN-BASED DISTRIBUTED LEDGER"; U.S. Provisional Patent Application No. 63/584,261 filed Sep. 21, 2023 and titled "SYSTEMS AND METHODS OF DEPLOYING A CIPHER FOR COMPLIANCE TRANSACTIONS"; U.S. Provisional Patent Application No. 63/584,275 filed Sep. 21, 2023 and titled "CRYPTOGRAPHIC CIPHER FOR THE SEGMENTATION OF PERSONAL IDENTIFYING INFORMATION, PROTECTED HEALTH INFORMATION, AND PLATFORM PERMISSIONING"; and U.S. Provisional Patent Application No. 63/584,286 filed Sep. 21, 2023 and titled "CRYPTOGRAPHIC CIPHER FOR RETRIEVAL OF PERSONAL IDENTIFYING INFORMATION, PROTECTED HEALTH INFORMATION, AND PLATFORM."

I. Example Use Case

Systems, methods, and apparatuses are described herein which relate generally to a software mechanism and data storage and retrieval architecture utilizing public key cryptography across distributed functions to automate health data compliance with regulatory and standards criteria for security, integrity, privacy, permissioned access, record keeping, and verifiability of these criteria for use of that data in software, firmware, and hardware. In the following description, for purposes of explanation, numerous specific details are set forth to provide a thorough understanding of the present disclosure. It will be evident, however, to one skilled in the art that the present disclosure may be practiced without these specific details and/or with any combination of these details.

Data segmentation and data security are at the heart of scalable solutions delivering patient centered access. The ability for the patient to direct the decryption of their own information, alongside a secondary decryption of the healthcare transactions (PHI), across multiple regulatory jurisdictions, is a fundamental challenge within the healthcare industry. The complexity of the industry, alongside the industries desire to avoid perceived risks has limited the evolution of security and access protocols across the industry.

One embodiment of the present disclosure resolves these challenges to managing health data by providing physical segmentation between different data types (e.g., between two relational database management system (RDBMS) objects (using HIPAA acronyms: personally identifiable information (PII) and protected health information (PHI))). The system also uses a masking universal unique identifier (UUID) which provides the first level of de-identification. The UUID of the PII, which may operate as the user's credential, is used to link PHI to a user. Next, the system selects the public distributed ledger technology (DLT) key from the block and transaction ID, returning two items, the JavaScript Object Notation (JSON) meta data, describing the transaction set, and the block number that was solved.

In order to decrypt the encrypted data, the system needs the participant's UUID (e.g., a first user UUID, a second user UUID, etc.) based encryption key, and other encryption keys (e.g., associated with the given data type). Within the architecture, activities (methods) are serialized at the transaction level, therefore the only information within the life of the participant's activity that can be decrypted through this process is the discrete data associated with the transaction. Upon receiving the necessary encryption keys, the encrypted value may be decrypted and provided to authorized entities (e.g., clinical trial organizers).

Various examples below outline the capabilities of a system of various embodiments discussed herein.

In one aspect, the present disclosure relates to cryptographic ciphers underlying the collection, storage, and retrieval of compliant data objects.

In another aspect, the present disclosure relates to a cryptographic cipher for the segmentation of personal identifying information (PII), protected health information (PHI), and platform permissioning (PLAT).

In another aspect, the present disclosure relates to a cryptographic cipher for compliance transactions.

In another aspect, the present disclosure relates to a cryptographic cipher for storing and retrieving PII, PHI, and/or PLAT In another aspect, the present disclosure relates to cryptographic algorithms for encrypting, decrypting, and/or reconstituting data, wherein the data is under one or more compliance regimes.

In another aspect, the systems and methods of the present disclosure leverage a combination of RSA signature, SHA-256, serialized blockchain protocol, and SALT encryption standards into a multi-regime compliant cipher.

In another aspect, the present disclosure relates to methods of processing data-transactions using cryptographic cipher(s) according to the present disclosure. The method, in one aspect, incorporates multithreading for increased cryptographic protection (e.g., monitoring, auditing, logging). The method, in another aspect, incorporates multithreading for efficient and effective database management (e.g., use of the storage space; use of processing resources; use of cache and translation lookaside buffer (TLB)). At all times, the method(s) of using the cryptographic algorithm(s) is in line with one or more compliance regimes.

In another aspect, the present disclosure generally relates to methods, systems, apparatuses, and non-transitory computer readable media employing a data storage and retrieval architecture utilizing key-based cryptography across distributed functions, to automate compliance with multiple regulatory regimes, for purposes of increased security, integrity, privacy, permissioned access, record keeping, and verification as compared to the conventional art.

In another aspect, the systems and methods of the present disclosure address and overcome one or more of the shortcomings and drawbacks of existing systems by building in heightened data access controls, traceability, and deidentification at the data architecture foundation, via public key cryptography, and via the separate storage of identity and digital transaction content, with compliance authentication hashed onto a permissionless distributed ledger, and by granting fine-tuned data access and use permissions on a need-to-know/need-to-use basis via allocation of cryptographic keys.

In another aspect, the systems and methods of the present disclosure provide for a data architecture that keeps PII and PHI separate via a PII private blockchain and PHI private blockchain that associates or ties PII, corresponding to a patient identifier, with a public key and with transaction identifier(s) (transactionID) generated from the private blockchains. In another aspect, for subsequent PII and/or PHI transactions, the PII private blockchain and the PHI private blockchain associate or tie PII with PHI, via the patient identifier (for example, a UUID) as well the relevant transactionID(s).

In another aspect, the systems and methods of the present disclosure relate to a system comprising a data compliance engine and a data repository, wherein the data architecture blends public and private blockchains to maximize speed, scalability, and security for participant interactions. In another aspect, the systems and methods of the present disclosure allows for simple user/participant experience and interface for entering encrypted payloads containing PII. In another aspect, the systems and methods of the present disclosure allow for automated clinical care processes for third-party consumers/exchangers/supervisors of system-managed data. In another aspect, the systems and methods of the present disclosure allow for digitalizing what is traditionally manual-entry administrative tasks on the side of the third-party consumers/exchangers/supervisors of system-managed data, or on the side of third-party participants transmitting PHI into the system. In another aspect, the systems and methods of the present disclosure allow for the system to integrate with third-part software to overly existing process, and/or to standardize data across partners and for data analysis tools. In another aspect, the systems and methods of the present disclosure provide immutable audit trails and data quality control mechanisms.

In another aspect, the systems and methods of the present disclosure allow for the creation and implementation of an FDA-Admissible Real-World Data Repository, which is a database or collection of health-related data derived from real-world sources such as electronic health records (EHRs), insurance claims, pharmacy records, patient registries, and wearable devices, that meet the standards and requirements set forth by the U.S. Food and Drug Administration (FDA) for use in regulatory decision-making processes. In another aspect, the systems and methods of the present disclosure include requirements related to data integrity, completeness, accuracy, privacy protection, and compliance with relevant regulations such as HIPAA (Health Insurance Portability and Accountability Act) for safeguarding patient information. In this way, in another aspect, the systems and methods of the present disclosure are configured for post-market surveillance, safety monitoring, comparative effectiveness research, and informing regulatory decision-making related to drug development and approval, medical device development and approval, etc. As such, in another aspect, the systems and methods of the present disclosure enable regulators or approved/permissioned third-party personnel (with proper credentialing, for example) to access real-world evidence to supplement traditional regulation-required data.

In another aspect, the system and methods of the present disclosure are implemented by leveraging a decentralized platform having multiple subnets providing fast, efficient, and scalable consensus mechanisms for distributed ledgers that record all transactions in a secure and immutable manner. The decentralized platform, in another aspect, is based on a metastable mechanism allowing for quick finality and high throughput. In another aspect, each node or block of the chain contains a cryptographic hash of the previous block, linking them together in a chain, as well as various other elements described herein.

In another aspect, each subnet of the decentralized network has its own rules, validators, and governance structures. Rules—or "operating procedures" governing transactions—refer to the set of guidelines or protocols that dictate how transactions are processed and validated within a specific subnet. These rules include parameters such as the consensus mechanism used, the block size, transaction fees, and any other conditions that determine how the subnet operates.

In another aspect, validators are responsible for verifying and validating transactions to ensure they meet the rules set forth by the subnet. Validators play a role in maintaining the integrity and security of the network by preventing fraudulent or invalid transactions from being included in the blockchain. Validators are typically nodes run by individuals or organizations that have staked collateral, which incentivizes them to act honestly and follow the rules of the subnet.

In another aspect, governance structures refer to the mechanisms and processes by which decisions are made and changes are implemented within the subnet. This includes protocols for electing validators, proposing and voting on changes to the subnet's rules, and resolving disputes or conflicts that may arise. Governance structures ensure that the subnet remains decentralized and autonomous.

In another aspect, the system and methods of the present disclosure are implemented by leveraging a sub-system that operates without a central authority or single point of control; instead, relying on a distributed network of nodes, wherein each node typically maintains a copy of the chain ledger. Moreover, the chain's software code and data on the nodes is freely available for anyone to view, search, and analyze. In this way, in another aspect, systems and methods of the present disclosure allow for third parties to view and search data or metadata associated with personal identifying information (PII) and/or protected health information (PHI) (both of which are not stored on the distributed network/nodes and which cannot be obtained solely by use of the network/nodes), and allow for operators of the system to know what is being searched and what is being search for. As such, in another aspect, systems and methods of the present disclosure operate as a type of data broker that allows for sensitive information like PII and PHI to go into the system and out of the system, in an encryption and secure fashion, but that also allows for the exchange of PII and PHI (at a highly granular level) when permissioned, and which allows for removal of access to the shared PII and PHI when permissions are rescinded.

In another aspect, the systems and methods of the present disclosure are implemented by leveraging a proof-of-stake (PoS) consensus mechanism or a proof-of-work (PoW) consensus mechanism used to achieve agreement on the state of the subnets/nodes among network participants. In a POS system, validators are selected to create and validate new blocks based on the amount of collateral they are willing to stake, or validators are chosen through various methods, such as random selection or based on their stake size. PoS is known for its energy efficiency compared to PoW, where miners compete to solve complex mathematical puzzles.

In another aspect, the systems and methods of the present disclosure are implemented by leveraging the smart contract functionality of a decentralized platform comprising multiple subnets. In another aspect, the smart contracts are self-executing contracts with the terms of the agreement directly written into functions underlying the system. The functions/code execute and enforce the terms of the contract when predefined conditions are met. This functionality enables a wide range of use cases, including decentralized finance (DeFi), decentralized autonomous organizations (DAOs), and tokenization of assets.

In another aspect, the systems and methods of the present disclosure provides for issuance of a utility token providing access to a specific product or service using a subnet/node based ecosystem. In particular, the present disclosure relates to a utility token linked a system and network for encrypting, decrypting, searching, and storing PII and/or PHI, and allowing for the permissioned request/exchange of such data for clinical research studies, clinical trials, or the like. In another aspect, the systems and methods of the present disclosure leverage functions and protocols that enable the creation and management of access rights to PII and/or PHI, as are typically required by overarching governance/regulatory regimes. In another aspect, the systems and methods of the present disclosure leverage identity verification mechanisms to authenticate users requesting access to PII/PHI data. This may involve integrating with identity management solutions or leveraging chain/node-based encryption protocols and UUID-based permissioning for decentralized and verifiable identity verification. In another aspect, the systems and methods of the present disclosure maintain comprehensive audit trails and logging mechanisms to track node transactions, database access requests, and the storing of decrypted and encrypted payloads, all in an effort to ensure accountability, transparency, and compliance with regulatory requirements.

In another aspect, the systems and methods of the present disclosure leverage an Avalanche™ consensus algorithm to quickly confirm transactions, achieve high throughput, reduce splits, and allows for the creation of multiple subnets, which operate independently with their own rules, validators, and governance structures. In another aspect, the systems and methods of the present disclosure leverage Avalanche sub-protocols to confirm thousands of transactions per second (TPS). In another aspect, the systems and methods of the present disclosure leverage the Snow family of voting-based or quorum-based consensus protocols (e.g., Slush, Snowflake, Snowball, and/or Avalanche) to achieve randomized sampling and metastability to ascertain and persist transactions. In another aspect, the systems and methods of the present disclosure leverage In another aspect, the systems and methods of the present disclosure leverage method-based functions defining behaviors or actions that objects of a class can perform, and that are associated with an object and can operate on the data within that object.

In another aspect, systems and methods of the present disclosure leverage a cryptographic cipher stack comprising a record management layer responsible for managing data records in a secure and organized manner, and providing functionalities for storing, retrieving, and managing records securely, ensuring data integrity, confidentiality, and availability. In another aspect, systems and methods of the present disclosure leverage a storeRecord function used to securely store a single record in the system, typically, by taking a data element as input and encrypting it using cryptographic techniques according to the present disclosure before storing it in a database or file system. In another aspect, systems and methods of the present disclosure leverage a storeMultipleRecords function similar to storeRecord but this function allows storing multiple records at once, usually provided as an array or collection of records. In another aspect, systems and methods of the present disclosure leverage a fetchRecord function that retrieves a single record from the storage system based on a specified identifier or criteria, and that decrypts the retrieved data before presenting it to the requester. In another aspect, systems and methods of the present disclosure leverage a fetchMultipleRecords function that, like the fetchRecord function, retrieves multiple records based on specified criteria or identifiers. In another aspect, systems and methods of the present disclosure leverage a fetchRecordIdentifier function that retrieves the identifier or key associated with a single record without revealing its contents. In another aspect, systems and methods of the present disclosure leverage a fetchMultipleRecordIdentifier function similar to the fetchRecordIdentifier function but for multiple records. In another aspect, systems and methods of the present disclosure leverage a fetchRecordMetaData function that retrieves metadata associated with a single record such as, for example, creation timestamp, owner, or any other relevant attributes. In another aspect, systems and methods of the present disclosure leverage a fetchMultipleRecordMetaData function similar to the fetchRecordMetaData but for multiple records.

In another aspect, systems and methods of the present disclosure leverage a hyper extended version of the Ethereum™ Virtual Machine (EVM) designed to offer additional features and capabilities beyond what is available in the traditional EVM. In another aspect, systems and methods of the present disclosure leverage hyper EVM functionalities that: execute transactions to store or retrieve records on a blockchain; implement access control mechanisms to ensure authorized access; and handle events emitted to update the state of records or trigger certain actions. In another aspect, systems and methods of the present disclosure leverage a hyperEVM for subnet protocol processing.

In another aspect, systems and methods of the present disclosure leverage external, separate storage databases or external services for system functions, in particular, for public functions related to the record manager. In another aspect, systems and methods of the present disclosure leverage a cloud vault connection constructor to handle environmental variables and/or to perform second key encryption or decryption, for example. In another aspect, systems and methods of the present disclosure leverage a cloud vault connection constructor to initialize object(s) responsible for securely storing and managing sensitive information such as cryptographic keys, passwords, and certificates, and to enable the record manager and/or hyper EVM to securely retrieve environment variables including encryption keys, API keys, or other sensitive information. In another aspect, systems and methods of the present disclosure leverage a cloud vault connection constructor to perform second key encryption and decryption operations where data encryption/decryption is done with a data encryption key and where the data encryption key itself is stored in the cloud vault. In another aspect, systems and methods of the present disclosure leverage a database constructor to initialize object(s) responsible for establishing a connection to the system database where encrypted records are stored, and for enabling the record manager and/or the hyper EVM to perform read and write operations. In another aspect, systems and methods of the present disclosure leverage dbconnection objects instantiated by the database constructor which provide methods for executing SQL queries, handing database transactions, and managing connections. In particular, in another aspect, systems and methods of the present disclosure leverage a database constructor to initialize an object responsible for connecting to Azure™ Key Vault, a service provided by Microsoft™ Azure™ for securely storing and managing sensitive information.

In another aspect, with more specificity, systems and methods of the present disclosure leverage a storerecord function that takes at least two parameters: payload and otherColumnData. The payload parameter represents the data to be stored, while otherColumnData includes any additional data to be stored alongside the payload. The function returns the rowID of the newly inserted record once the database transaction is complete. In another aspect, systems and methods of the present disclosure leverage a storerecord function with the following functionality. The function first encrypts the payload using second key encryption. This ensures that the payload is securely encrypted, adding an extra layer of protection. Next, the function generates a searchable hash for the payload; allowing for efficient searching and retrieval of records based on the payload content. The encrypted payload and the searchable hash are then stored in the database, along with any additional column data provided. This ensures that the encrypted data is securely stored and associated with relevant metadata. Finally, the function returns the rowID of the newly inserted record in the database, indicating that the database transaction was successful.

In another aspect, systems and methods of the present disclosure leverage a cryptographic cipher stack comprising a DB management (e.g., an RDBMSmanager for an RDBMS) layer responsible for managing read/write operations within the database instance, having a constructor that initializes a DBconnection object, and having public functions for storing records in the database, retrieving records based on rowID, fetching transactionIDs associated with a subnet, and retrieving hashing salt for a subnet, and private functions for internal use within the DBManager class, such as fetching names of all searchable columns in the database.

In another aspect, systems and methods of the present disclosure leverage a cryptographic cipher stack comprising a crypto management (e.g., a CryptoManager) layer responsible for managing the encryption and decryption process, having an EncryptedPassword constructor to incorporate password-related encryption, and having public functions such as generateHash, encryptData, and decryptData (which are accessible by other components such as the record manager and hyper EVM to perform cryptographic operations on sensitive data), and private functions for generating a cryptographic salt from a given source, obtaining three references from parameters and a fourth reference from a third party separate cloud vault, obtaining or generating a primary encryption key, performing secondary or tertiary encryption or hashing, and decrypting data encrypted using the second encryption key, etc.

In another aspect, with more specificity, systems and methods of the present disclosure leverage a createEncryptionKey function that takes at least three parameters: an identifier for a PII subnet transaction; an identifier for a PHI subnet transaction; and an identifier for a platform subnet transaction. The function returns the encryption key, ready to be utilized for cryptographic operations. In another aspect, systems and methods of the present disclosure leverage a createEncryptionKey function with the following functionality. The function begins by retrieving all the necessary references required for key generation including the transaction IDs provided as parameters, serving as inputs to the key derivation process. Next, the function generates a cryptographic salt using the retrieved references. Next, the function utilizes the PII subnet transactionId, the PHI subnet transactionID, and the platform subnet transactionID to generate a salt, and then the function proceeds to generate the encryption key via the generated salt and a password stored on a cloudvault, for example.

In another aspect, with more specificity, systems and methods of the present disclosure leverage a createEncryptionKey function with the following functionality. The function starts by extracting all three transaction IDs from a cipher table. Next, the function accesses the Azure Vault to retrieve the fourth reference, which serves as the password. The function next calls a SHA-256 hashing function to generate a cryptographic salt. Next, the function accesses the generateSalt function and the password (the fourth reference) obtained from the Azure Vault. Finally, the function utilizes the obtained references (transaction IDs and password) to invoke a PBKDF2 (Password-Based Key Derivation Function 2) function to iteratively apply a cryptographic hash function to derive the encryption key.

In another aspect, with more specificity, systems and methods of the present disclosure leverage an EncryptData function with the following functionality. The EncryptData function starts by calling the createEncryptionKey function, passing the first, second, and third subnet transaction IDs as parameters. This step generates a secure encryption key. Once the encryption key is generated, the function invokes the performFirstKeyEncryption function from the CryptoManager layer which passes the encryption key along with the unencrypted payload. With the payload encrypted using the primary key, the function proceeds to perform a second layer of encryption for enhanced security. It calls the performSecondEncryption function, passing the encrypted payload.

In another aspect, with more specificity, systems and methods of the present disclosure leverage a StoreRecord function with the following functionality. The function begins by retrieving the necessary transaction IDs, including the first, second, and third subnet transaction IDs, from the database via the getSubnetTxIds function. Next, the function calls the encryptData function, passing the unencrypted payload along with the reference transaction IDs obtained in the previous step. This results in the generation of an encrypted payload. The function extracts the relevant value from the otherColumnData, which contains additional information to be stored alongside the payload. Using the obtained transaction IDs, the function calls the getHashingSaltForSubnet function to retrieve the corresponding salts from the database. The function passes the extracted value and salts to the generateHash function, which calculates the hash of the value using a secure hashing algorithm. This hash serves as a searchable identifier for the stored data. The function next invokes the storeRecordInDB function, passing the encrypted payload along with relevant query parameters to store the encrypted data securely in the database. Similarly, the function calls the storeRecordInDB function again, this time passing the generated hash along with query parameters to store the searchable hash associated with the stored data. Upon successful completion of the database transaction, the function returns the rowID, which serves as the unique identifier for the stored record in the database.

In another aspect, with more specificity, systems and methods of the present disclosure leverage a fetchRecord function with the following functionality. The function starts by retrieving the necessary salts from the database by calling the getHashingSaltForSubnet function. Using the obtained salts, the function calls the generateHash function, passing the searchableString and salts. This generates a hash of the searchable string. The function next calls the getRecordInDB function, passing the generated hash and the optional columnNameToSearch. This function queries the database to find the matching record based on the generated hash and the specified column name, if provided. If a matching record is found in the database, the function calls the getRecordInDB function again to retrieve the encrypted payload associated with the record. Once the encrypted payload is obtained, the function calls the getSubnetTxId function to retrieve the necessary transaction IDs (e.g., first, second, and third subnet transaction IDs) from the database. Using the retrieved transaction IDs, the function calls the decryptData function, passing the encrypted payload and transaction IDs as parameters. This function decrypts the encrypted payload to obtain the original, unencrypted payload. Finally, the function returns the decrypted payload, providing access to the desired data associated with the searchable string.

In another aspect, with more specificity, systems and methods of the present disclosure leverage a fetchRecordIdentifier function with the following functionality. The function initiates by retrieving the necessary salts from the database using the getHashingSaltForSubnet function. Using the obtained salts, the function calls the generateHash function, passing the searchableString and salts. This generates a hash of the searchable string. The function iterates through every row in the database, attempting to match the generated hash with the stored hashes. This step ensures thorough coverage of all records in the database. If a matching record is found within the database, the function calls the getRecordInDB function to retrieve the corresponding row ID associated with the matched record. Finally, the function returns the retrieved row ID, providing access to the unique identifier associated with the matching record.

In another aspect, with more specificity, systems and methods of the present disclosure leverage a fetchRecordMetadata function with the following functionality. The function initiates by retrieving the necessary salts from the database using the getHashingSaltForSubnet function. Using the obtained salts, the function calls the generateHash function, passing the searchableString and salts as parameters. The function iterates through every row in the database, attempting to match the generated hash with the stored hashes. This step ensures thorough coverage of all records in the database. If a matching record is found within the database, the function calls the getRecordInDB function to retrieve the corresponding metadata associated with the matched record. Finally, the function returns the retrieved metadata, providing access to additional information associated with the matching record.

In another aspect, with more specificity, systems and methods of the present disclosure leverage a storeRecordinDB function with the following functionality. The function starts by determining the appropriate database table to store the payload based on the provided DBTableParam. This ensures that the payload is stored in the correct location within the database schema. Once the database table is identified, the function proceeds to store the payload securely in the database, for example, by executing an SQL query to insert the payload into the specified table, adhering to any defined constraints or validations. After successfully storing the payload in the database, the function generates a unique transaction ID to serve as an identifier for the stored record. This transaction ID is distinct from the transaction IDs used within the subnets and provides a reference to the stored data within the RDBMS. The function returns the generated transaction ID, allowing external components to reference and retrieve the stored record in the database as needed.

In another aspect, with more specificity, systems and methods of the present disclosure leverage a getRecordinDB function with the following functionality. The function initiates by querying the RDBMS based on the provided hash value. This query searches for a record matching the specified hash in the database table. Upon executing the database query, the function retrieves the record matching the provided hash from the database. This record typically consists of multiple columns containing various attributes or metadata associated with the stored data. Optional, if column specifications are provided, the function filters the retrieved record based on the specified columns. Finally, the function returns the retrieved record, providing access to the relevant information stored in the database associated with the provided hash.

In another aspect, with more specificity, systems and methods of the present disclosure leverage a getSubnetTXids function with the following functionality. The function starts by querying the RDBMS based on a provided identifier. This query retrieves a PII trxID, PHI trxID, and a PLATFORM trxID obtained from data transactions to the first, second, and third subnets.

In another aspect, with more specificity, systems and methods of the present disclosure leverage a getHashingSaltforSubnet function with the following functionality. The function initiates by querying the RDBMS to retrieve the hashing salt associated with the specified subnet transaction IDs. This query is based on the provided transaction IDs to ensure the retrieval of the correct salt. Upon executing the database query, the function retrieves the hashing salt associated with the specified subnet transaction IDs.

In another aspect, with more specificity, systems and methods of the present disclosure leverage a generateSaltfromSource function with the following functionality. The function begins by combining the provided sources to create a unified input for salt generation. These sources could include various factors as described in detail herein. Once the sources are combined, the function hashes the unified input using a secure hashing algorithm such as SHA-256. After hashing the combined sources, the function derives the hashing salt from the resulting hash value.

In another aspect, with more specificity, systems and methods of the present disclosure leverage a generateSaltfromSource function with the following functionality. The function starts by combining the provided data with the salt. Once the data and salt are combined, the function computes the hash value using a secure hashing algorithm such as SHA-256. This algorithm transforms the combined input into a fixed-length hash value.

In another aspect, systems and methods of the present disclosure are configured for securely storing data, the method comprising: retrieving transaction IDs associated with subnets from a database; encrypting payload data using the retrieved transaction IDs as references; generating a hash value of additional data and storing it securely; storing the encrypted payload and hash value in a database; and returning a row ID associated with the stored record and a transaction ID.

In another aspect, systems and methods of the present disclosure are configured for generating encryption keys, the method comprising: retrieving references including subnet transaction IDs and a password from a secure storage; combining the retrieved references to generate a unique salt; utilizing a key derivation function with the combined salt and password to generate an encryption key; and providing the encryption key for subsequent encryption operations.

In another aspect, systems and methods of the present disclosure are configured for retrieving records from a database, the method comprising: retrieving hashing salts associated with subnet transaction IDs from a database; generating a hash value of a searchable string using the retrieved hashing salts; searching for a matching record in the database based on the generated hash value; retrieving the desired record from the database based on the search results; decrypting the retrieved record, if encrypted, using appropriate encryption keys; and returning the decrypted record to the requester.

In another aspect, systems and methods of the present disclosure have the following data flow sequence: a user completes the form on the front end; the new user data will be passed to the irbService/saveUserInput( ) api endpoint; all the user data that are relevant for irbcontent table and the blockchain will be passed to the javascript library; JS application will pass the separated out data fields (hashable, encryptable and un-encryptable) to the storeRecord( ) as parameter; inside storeRecord (data, subnet_reference), initialize the SubnetManager by providing the connection details such as providerURL, privateKeys, and contractAddress; create the hashes of the required fields in data; insert the un-encryptable data and the hashes of the field to the irbcontent table; push selected fields from the data to the PII subnet by calling pushRecord( ) from the SubnetManager and get the transactionId; perform the encryption, call the encryptData( ) from the cryptoManager to encrypt the payload; inside encryptData( ), create the encryption key via createEncryptionKey( ) which will generate the password from the given key (transaction ID), secret from the Azure Vault and the random salt; performFirstKeyEncryption( ), which will perform the AES256 encryption on the given payload with the help of the created key; performSecondKeyEncryption( ), which will perform the Azure's vault encryption on the already encrypted payload; save the encryption descriptor in the cypher_descriptor table and get the reference id of the row; save the encrypted payload, transaction id, encryption descriptor and the random salt in the irbcontent table; column name will be encrypted_payload, transaction_id, fk_encryption_descriptor_id and encryption_salt respectively; return the row of irbcontent if the process is complete.

II. With Reference to the FIGS

Reference will now be made in detail to aspects of the disclosure, examples of which are illustrated in the accompanying drawings. The following description refers to the accompanying drawings in which the same numbers in different drawings represent the same or similar elements unless otherwise represented. The implementations set forth in the following description do not represent all implementations consistent with the disclosure. Instead, they are merely examples of apparatuses and methods consistent with aspects related to the disclosure as recited in the appended claims. Particular aspects of the present disclosure are described in greater detail below. The terms and definitions provided herein control, if in conflict with terms and/or definitions incorporated by reference.

Systems, methods, and apparatuses are described herein which relate generally to managing data, namely health data. As such, the systems, methods, and apparatuses described herein relate generally to a software mechanism and data storage and retrieval architecture utilizing public key cryptography across distributed functions to automate health data compliance with regulatory and standards criteria for security, integrity, privacy, permissioned access, record keeping, and verifiability of these criteria for use of that data in software, firmware, and hardware. In the following description, for purposes of explanation, numerous specific details are set forth to provide a thorough understanding of the present disclosure. It will be evident, however, to one skilled in the art that the present disclosure may be practiced without these specific details and/or with any combination of these details.

Referring now to FIG. 1, a block diagram illustrating a system environment ("system") for managing health data, in accordance with various embodiments is provided. While various embodiments discussed herein relate to managing health data, any number of different data types may be processed, stored, and used using the operations herein.

The system includes computing device(s) 152 and a data management system 175 connected to a network 100. As shown, the computing device(s) 152 (e.g., desktop computer 107, mobile phone 112, laptop 126, and/or the like) associated with users (e.g., clients, healthcare providers, etc.) are in communication with network 100. The data management system 175 is also in communication with the network 100.

The data management system 175 includes one or more data management servers 151 and one or more data management databases 205. In various embodiments, the data management server(s) 151 may be made of multiple servers. In various embodiments, the data management database(s)

205 may be part of the data management server(s) 151 (e.g., at least a portion of the data management database(s) 205 may be stored on the memory device(s) 268 of the data management server(s) 151). Additionally or alternatively, at least a portion of the data management database(s) 205 may be stored remote from the data management server(s) 151. The data management system 175 may be in communication with one or more distributed ledger subnet(s) 195. The distributed ledger subnet(s) 195 may be in communication with the network 100.

The data management database(s) 205 may be part or, or in communication with the data management system 175. The data management database(s) 205 may include encrypted values associated with one or more data packets. For example, the data management database(s) 205 may include one or more tables with encrypted values for one or more data packets, as discussed herein. The encrypted values may be generally non-readable, such that little to no security is necessary. In various embodiments, the data management database(s) 205 may be encrypted to avoid any unauthorized actors from accessing the tables within the data management database(s) 205.

In various embodiments, the data management system 175 may be in communication with one or more distributed ledger subnet(s) 195. The distributed ledger subnet(s) 195 may be in communication with the network 100. The distributed ledger subnet(s) 195 may include one or more nodes, as discussed in reference to FIGS. 4-6. The distributed ledger subnet(s) 195 may include multiple subnets that segment different data types. For example, the distributed ledger subnet(s) 195 may include a PII subnet, a PHI subnet, and a platform subnet. As such, the type of data may determine the distributed ledger subnet in which data is recorded. In various embodiments, the distributed ledger subnet(s) 195 may store information relating to an encrypted data packet. For example, the distributed ledger subnet may include a UUID or other key information to decrypt the encrypted data packets.

Figure 2:
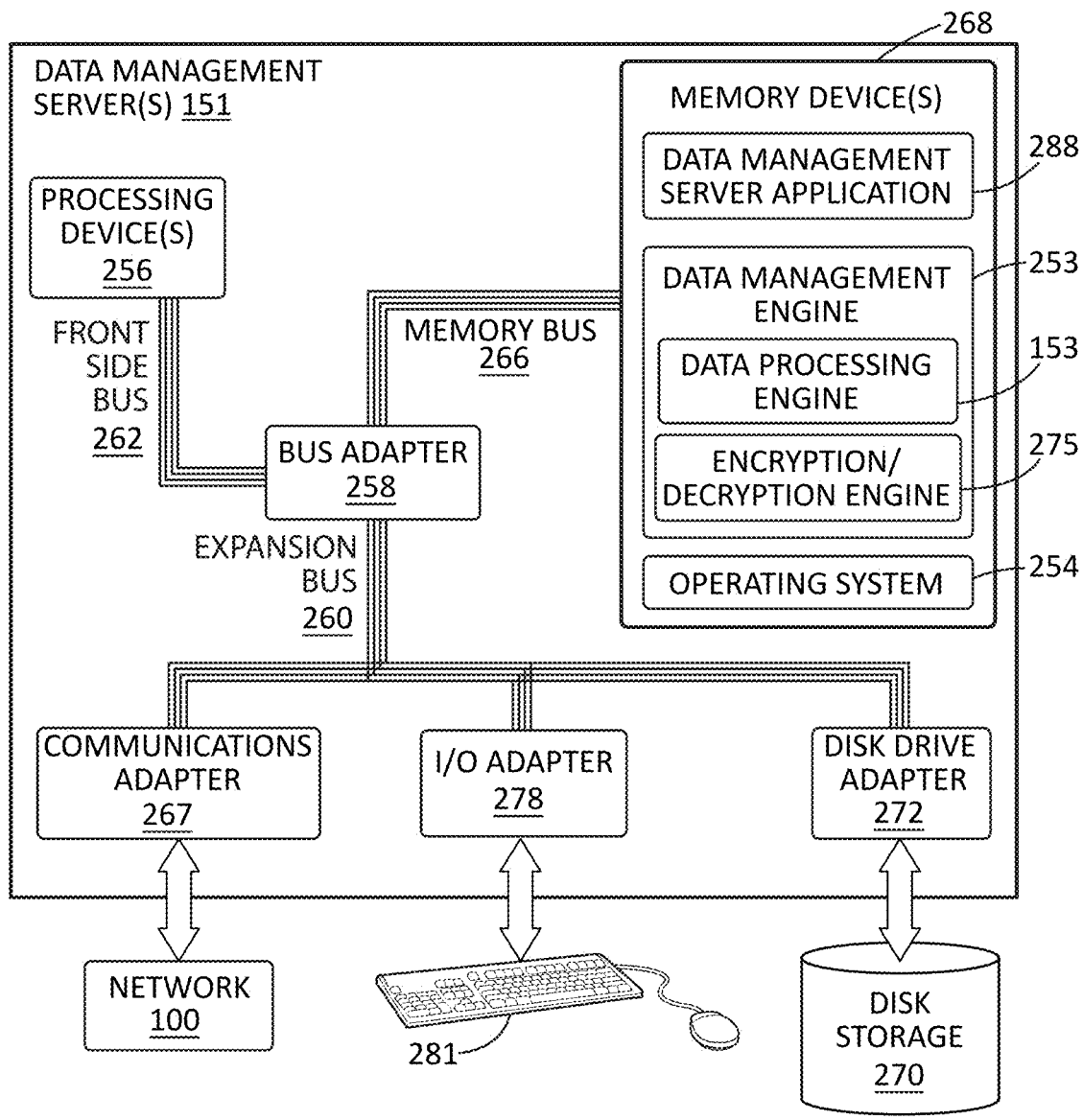
FIG. 2 provides a block diagram illustrating the data management server(s) 151 of FIG. 1, in accordance with various embodiments of the present disclosure.

Referring now to FIG. 2, a block diagram illustrating the data management server(s) 151 of FIG. 1, in accordance with various embodiments is provided. FIG. 2 is merely illustrative an example data management server(s) 151. In various embodiments, the data management server(s) 151 may share components with the computing device(s) 152 (e.g., the data management server(s) 151 may use at least a portion of the processing device(s) 356 of the computing device(s) 152 shown in FIG. 3). The data management server(s) 151 may be comprised of one or more servers. In various embodiments, the data management server(s) 151 may be capable of processing user inputs via a computing device(s) 152 and generating user interfaces to be rendered to computing device(s) 152.

The data management server(s) 151 of FIG. 2 includes one or more processing devices 256 and one or more memory devices 268, communication adapter 267, an input/output adapter 278, and a disk drive adapter 272. In various embodiments, the various components may be connected to one another via a BUS adapter 258 (e.g., the processing device(s) 256 may be attached via a front side BUS 262, the memory device(s) 268 may be attached via a memory BUS 266, and the communication adapter 267, I/O adapter 278, disk drive adapter 272, and/or other interfaces may be attached via expansion BUS 260).

It should be understood that the memory device(s) 268 may include one or more databases or other data structures/repositories. The memory device(s) 268 also includes computer-executable program code that instructs the processing device(s) 256 to operate the network communication interface (e.g., communication adapter 267) to perform certain communication functions of the system described herein. For example, in one embodiment of the data management server(s) 151, the memory device(s) 268 includes, but is not limited to, a data management server application 288, a data management engine 253, and an operating system 254. The data management engine 253 may also include a data processing engine 153, an encryption/decryption engine 275, and/or the like with instructions to carry out the processing of the data packets discussed herein. The encryption/decryption engine 275 may include the necessary functionality to allow the data packets herein to be encrypted and/or decrypted. As such, the encryption/decryption engine 275 may include the encryption algorithm and/or various encryption keys used for such encryption.

The data management engine 253 may have various other components that are capable of processing user inputs via a computing device(s) 152. The memory device(s) 268 may store, among other things, one or more cryptographic private keys, control logic used to orchestrate the functioning of the data management server(s) 151, including logic implementing the functions described above, and various databases of information, including identity data encrypted with a first cryptographic key, digital transaction content with a second cryptographic key and compliance authentication data encrypted with a third cryptographic key.

Some embodiments of the data management server(s) 151 include processing device(s) 256 communicably coupled to such components as the memory device(s) 268, the communication adapter 267, the input/output adapter 278, the disk drive adapter 272, and/or the like. The processing device(s) 256, and other processors described herein, generally include circuitry for implementing communication and/or logic functions of the system. For example, the processing device(s) 256 may include a digital signal processor device, a microprocessor device, and various analog to digital converters, digital to analog converters, and/or other support circuits. Control and signal processing functions of the data management server(s) 151 are allocated between these devices according to their respective capabilities. The processing device(s) 256 thus may also include the functionality to encode and interleave messages and data prior to modulation and transmission. The processing device(s) 256 can additionally include an internal data modem. Further, the processing device(s) 256 may include functionality to operate one or more software programs, which may be stored in the memory device(s) 268. For example, the processing device(s) 256 may be capable of operating a connectivity program to communicate via the communication adapter 267.

The processing device(s) 256 is configured to connect to the network 100 via the communication adapter 267 to communicate with one or more other devices on the network 100. In this regard, the communication adapter 267 may include various components, such as an antenna operatively coupled to a transmitter and a receiver (together a "transceiver"). The processing device(s) 256 is configured to provide signals to and receive signals from the transmitter and receiver, respectively. The signals may include signaling information in accordance with the air interface standard of the applicable cellular system of the network 100. In this regard, the data management server(s) 151 may be configured to operate with one or more air interface standards, communication protocols, modulation types, and access types. By way of illustration, the data management server(s) 151 may be configured to operate in accordance with any of a number of first, second, third, fourth, and/or fifth-generation communication protocols and/or the like. In various embodiments, the data management server(s) 151 may also be connected via other connection methods to one or more components of the data management system 175.

The memory device(s) 268 is connected to and editable by the processing device(s) 256. The memory device(s) 268 may store, among other things, one or more cryptographic private keys, control logic used to orchestrate the functioning of the data management server(s) 151, including logic implementing the functions described above, and various databases of information, including identity data encrypted with a first cryptographic key, digital transaction content with a second cryptographic key and compliance authentication data encrypted with a third cryptographic key.

As described further below, the cryptographic keys are associated with the private key of the public-private key pair (the private key of one of the public-private key pairs, for multi-signature addresses) of an identifier in a blockchain-based distributed ledger. As also described further below, the control logic may contain instructions that can be executed by the processing device(s) 256 to perform various functions of the data management server(s) 151 described herein, including the initiation of or processing a transaction containing health data involving the identifier.

Note that the control logic can be implemented in software, hardware, firmware or any combination thereof. In the example data management server(s) 151 shown in FIG. 2, the control logic is implemented in software and stored in the memory device(s) 268. When implemented in software, the control logic can be stored and transported on any computer-readable medium for use by or in connection with an instruction execution apparatus that can fetch and execute instructions, such as the processing device(s) 256.

Relatedly, in some embodiments the control logic may be part of a software application running on the data management server(s) 151. For example, the control logic may be part of a software application ("app") of a healthcare provider.

The I/O adapter 278, which allow the data management server(s) 151 to receive data from a user such as a system administrator, may include any of a number of devices allowing the data management server(s) 151 to receive data from the user, such as a keypad, keyboard 281, touch-screen, touchpad, microphone, mouse, joystick, other pointer device, button, soft key, and/or other input device(s). The user interface may also include a camera, such as a digital camera.

The disk drive adapter 272 may provide additional storage space via disk storage 270. Various other storage mediums may also be used by the data management server(s) 151, such as cloud storage (e.g., transmitted via the communication adapter 267).

Figure 3:
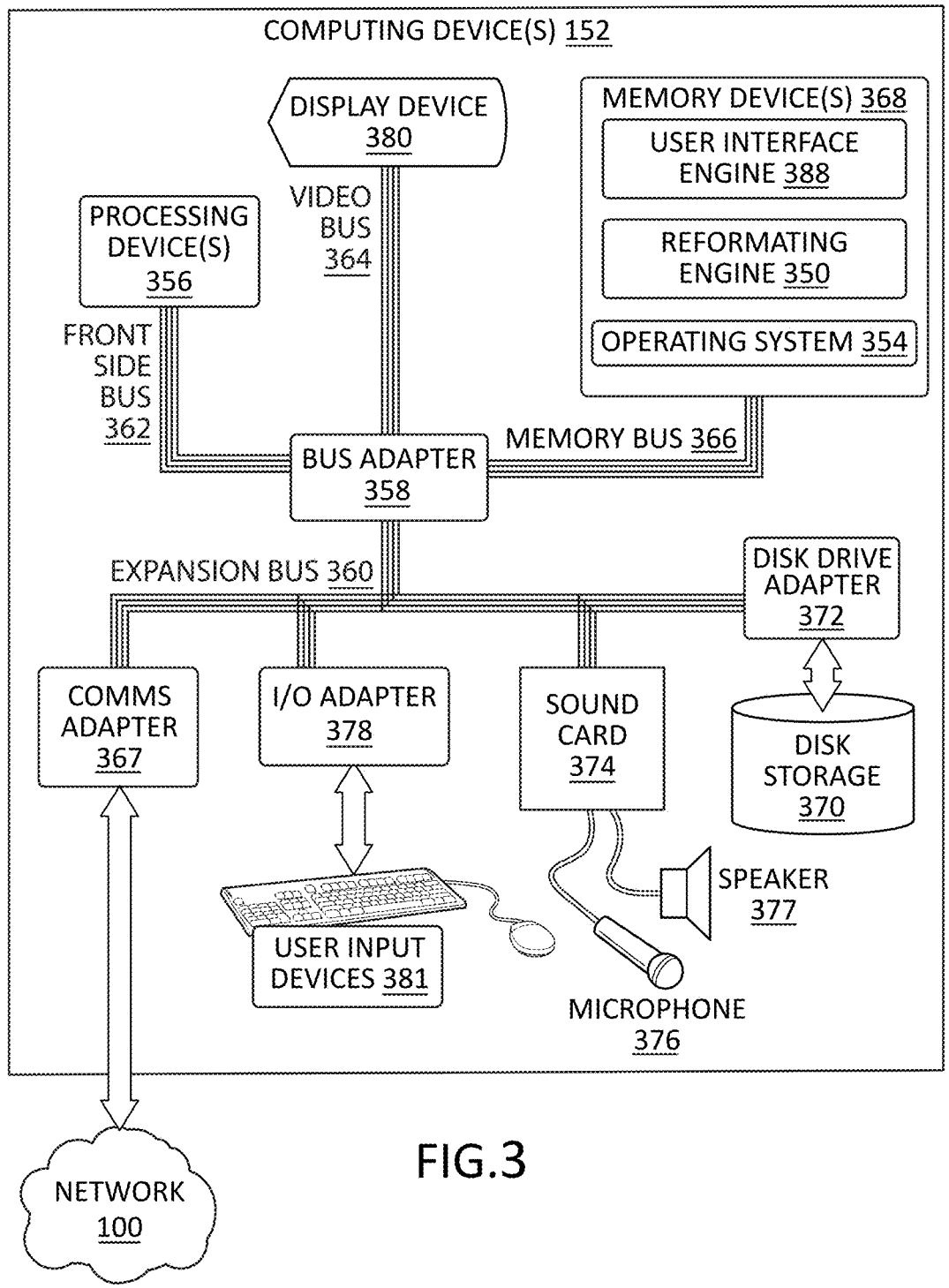
FIG. 3 provides a block diagram illustrating the computing device(s) 152 of FIG. 1, in accordance with various embodiments of the present disclosure.

Referring now to FIG. 3, a block diagram illustrating the computing device(s) 152 of FIG. 1, in accordance with various embodiments is provided. FIG. 3 is merely illustrative an example computing device(s) 152. Various types of computing device(s) 152 may be used or otherwise contemplated for the system. The computing device(s) 152 may include components to allow the computing device(s) 152 to assist or otherwise carry out the operations of the data management server(s) 151.

Example computing devices include desktop computers 107, mobile devices, such as mobile phones 112, tablets, smart watches, etc., laptops 126, and/or the like. As such, the computing device(s) 152 may be any device that is capable of performing the operations discussed herein. For example, a mobile phone may include communication interfaces to communication with mobile networks and local area networks (e.g., via Wi-Fi).

The computing device(s) 152 of FIG. 3 includes one or more processing devices 356, one or more memory devices 368, a display device 380, a communication adapter 367, an input/output adapter 378, and a disk drive adapter 372. In various embodiments, the various components may be connected to one another via a BUS adapter 358 (e.g., the processing device(s) 356 may be attached via a front side BUS 362, the memory device(s) 368 may be attached via a memory BUS 366, the display device 380 may be attached via a video BUS 364, and the communication adapter 367, I/O adapter 378, disk drive adapter 372, and/or other interfaces may be attached via expansion BUS 360).

It should be understood that the memory device(s) 368 may include one or more databases or other data structures/repositories. The memory device(s) 368 also includes computer-executable program code that instructs the processing device(s) 356 to operate the network communication interface (e.g., communication adapter 367) to perform certain communication functions of the system described herein. The memory device(s) 368 may include a user interface engine 388 with instructions on generating and/or rendering user interfaces to allow the computing device(s) 152 to interact via the network. The memory device(s) 368 also includes a reformatting engine 350 that includes instructions on reformatting data received from a data management system 175 as discussed herein to be rendered and/or otherwise processed by the computing device(s) 152. The memory device(s) 368 may also include the operating system 354 of the computing device(s) 152.

Some embodiments of the computing device(s) 152 include processing device(s) 356 communicably coupled to such components as the memory device(s) 368, the communication adapter 367, the input/output adapter 378, the disk drive adapter 372, and/or the like. The processing device(s) 356, and other processors described herein, generally include circuitry for implementing communication and/or logic functions of the system. For example, the processing device(s) 356 may include a digital signal processor device, a microprocessor device, and various analog to digital converters, digital to analog converters, and/or other support circuits. Control and signal processing functions of the computing device(s) 152 are allocated between these devices according to their respective capabilities. The processing device(s) 356 thus may also include the functionality to encode and interleave messages and data prior to modulation and transmission. The processing device(s) 356 can additionally include an internal data modem. Further, the processing device(s) 356 may include functionality to operate one or more software programs, which may be stored in the memory device(s) 368. For example, the processing device(s) 356 may be capable of operating a connectivity program to communicate via the communication adapter 367.

The processing device(s) 356 is configured to connect to the network 100 via the communication adapter 367 to communicate with one or more other devices on the network 100. In this regard, the communication adapter 367 may include various components, such as an antenna operatively coupled to a transmitter and a receiver (together a "transceiver"). The processing device(s) 356 is configured to provide signals to and receive signals from the transmitter and receiver, respectively. The signals may include signaling information in accordance with the air interface standard of the applicable cellular system of the network 100. In this regard, the computing device(s) 152 may be configured to operate with one or more air interface standards, communication protocols, modulation types, and access types. By way of illustration, the computing device(s) 152 may be configured to operate in accordance with any of a number of first, second, third, fourth, and/or fifth-generation communication protocols and/or the like).

The I/O adapter 378, which allow the computing device(s) 152 to receive data from a user such as a system administrator, may include any of a number of devices allowing the computing device(s) 152 to receive data from the user, such as a keypad, keyboard 381, touch-screen, touchpad, microphone, mouse, joystick, other pointer device, button, soft key, and/or other input device(s). The user interface may also include a camera, such as a digital camera.

The disk drive adapter 372 may provide additional storage space via disk storage 370. Various other storage mediums may also be used by the computing device(s) 152, such as cloud storage (e.g., transmitted via the communication adapter 367).

As described above, the computing device(s) 152 has a user interface that is, like other user interfaces described herein, rendered via the display device 380. The display device 380 include a display (e.g., a liquid crystal display or the like) and/or a speaker or other audio device, which are operatively coupled to the processing device(s) 356. As such, the data packets and/or information obtained from data packets discussed herein may be provided to the computing device(s) 152 via the display device 380 (e.g., visually via the user interface). in various embodiments, the display device 380 may be in communication with a sound card 374 (e.g., attached to a microphone 376 and/or a speaker 377 (e.g., the speaker 377 may be part of the display device 380 or standalone)).

Figure 4:
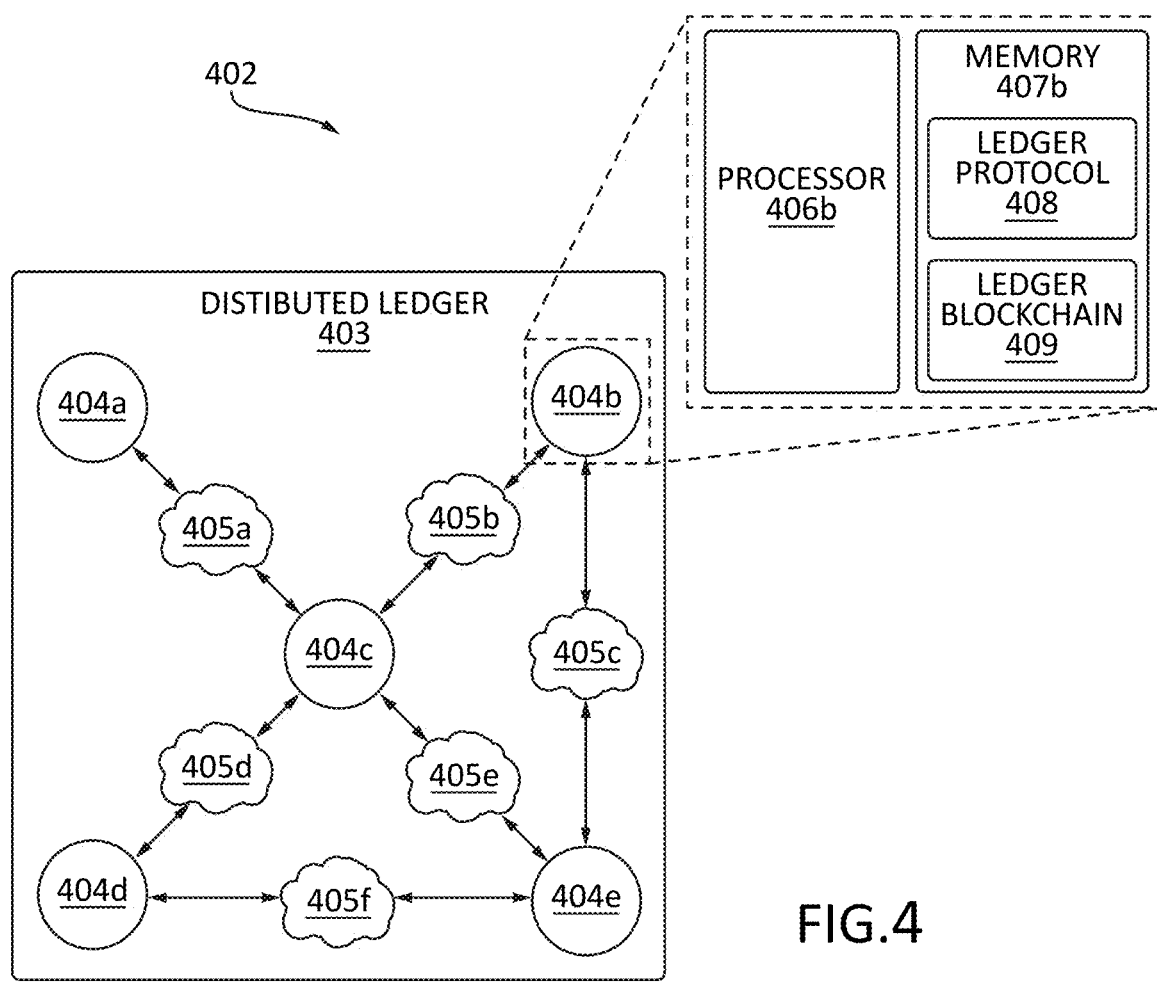
FIG. 4 is a block diagram illustrating a blockchain-based distributed ledger network, in accordance with various embodiments of the present disclosure.

A basic overview of the terminology and general architecture of blockchain-based distributed ledger, a system utilizing a blockchain-based distributed ledger, is useful. FIG. 4 is a simplified schematic giving a basic overview of the general architecture of blockchain-based distributed ledger. A distributed ledger may be one of the distributed ledger subnet(s) 195 shown in FIG. 1. The distributed ledger subnet(s) 195 may be part of the same distributed ledger (e.g., segmented into individual subnets) and/or part of different distributed ledgers (e.g., subnets on different distributed ledgers.

As shown by the figure, a blockchain-based distributed ledger architecture 402 comprises a blockchain-based distributed ledger network 403 that has a plurality of ledger nodes 404 (shown in FIG. 4 as ledger nodes 404a, 404b, 404c, 404d, and 404e). In general, the ledger nodes 404 may communicate with one another over various networks 405 (shown in FIG. 4 as networks 405a, 405b, 405c, 405d, 405e, 405e, and 405f), such as the internet.

With regards to their purpose, the ledger nodes 404 generally work to modify a ledger blockchain 409 according to the procedures dictated by a ledger protocol 408. Towards this end, each node is generally associated with one or more processors (shown in FIG. 4 for ledger node 404b as processor 406b) and a memory unit (shown in FIG. 4 for ledger node 404b as memory 407b). Stored in each ledger node's memory is an executable form of the ledger protocol 408 and a copy of the ledger blockchain 409. Together, the ledger network 403, the ledger protocol 408, and the ledger blockchain 409 comprise the overall ledger architecture 402.

More precisely, the ledger blockchain 409 is a type of (distributed and decentralized) database where the stored data is a series of records (i.e., transactions) that are grouped into cryptographically linked lists called blocks. These records generally concern amounts of a digital asset, sometimes called "coins" or "tokens", created by the ledger architecture 402. The ledger protocol 408 is a set of instructions/rules (e.g., a program) dictating how the ledger blockchain 409 is processed (e.g., how new transactions are added). Generally speaking, the various ledger nodes 404 each process the ledger blockchain 409 according to the ledger protocol 408.

Because of the lack of a central authority in most ledger architecture 402, a consideration for the design of the ledger architecture 402 (i.e., the rules of ledger protocol 408) is how new blocks and transactions are added to the ledger blockchain 409. More precisely, the consideration is not just how new blocks and transactions are added to the ledger blockchain 409, but how the ledger nodes 404 can come to a consensus on the addition of a new block (and the corresponding transactions within that block).

Broadly speaking, a newly added block to a blockchain contains within itself a list of new transactions and a cryptographic hash of both those new transactions and of the previously added block. This hash may be required to meet certain criteria on which the ledger nodes 404 generally work to satisfy. This attempt produces a new block by generating a hash satisfying the criteria specified in the ledger protocol 408. Such a process is often referred to as "mining." The requirements on the hash of a new potential block are the primary mechanism by which the ledger nodes 404 are able to cooperatively agree on when a new block is added to the blockchain 409.

More precisely, many ledger architectures 402 are configured (i.e., their ledger protocol 408 requires) such that a new block is required to meet at least two requirements. First, the transactions within the new block must be valid (i.e., satisfy certain criteria specified by the ledger protocol 408). Second, the new block must include the hash of the previous block and the transactions within the new block that satisfy certain criteria specified by the ledger protocol 408. If and when a ledger node 404 finds such a hash, it transmits the new block to the rest of the ledger nodes 404 in the ledger network 403, which validate the new block and, upon confirming its validity, add it to their copy of the ledger blockchain 409. The ledger nodes 404 then continue working using the updated ledger blockchain 409.

Figure 5:
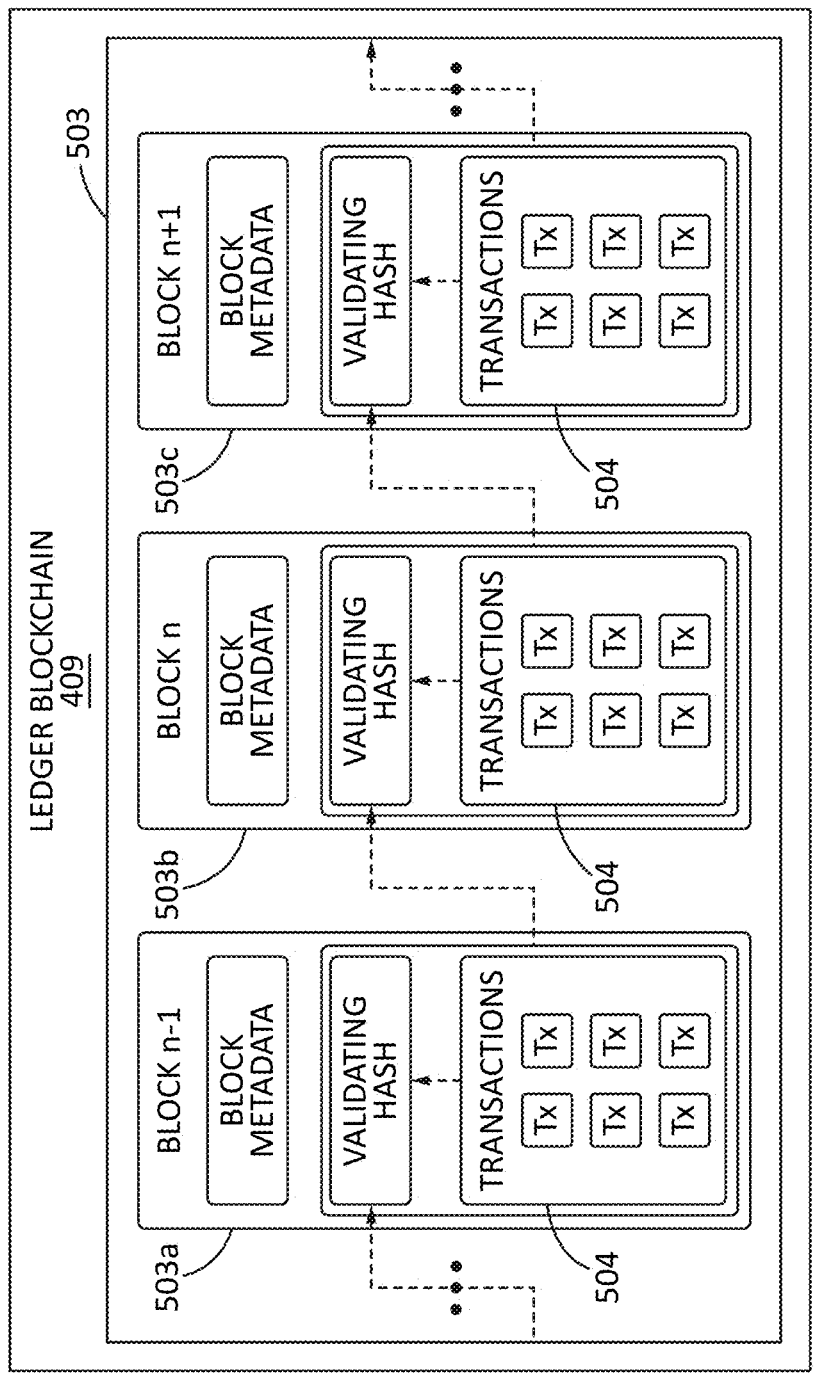
FIG. 5 is a block diagram illustrating a ledger blockchain, such as is depicted in FIG. 4, in accordance with various embodiments of the present disclosure.

FIG. 5 is a simplified diagram of the structure of the ledger blockchain 409. As shown by the figure, the ledger blockchain 409 comprises a plurality of blocks 503 (shown in FIG. 5 as blocks 503a, 503b, and 503c). Each block 503 comprises a series of transactions 504 and a validating hash. The validating hash is a hash of the ledger transactions 504 and the validating hash of the immediate prior block 503 whose value meets certain criteria defined by the associated ledger protocol 408.

Figure 6:
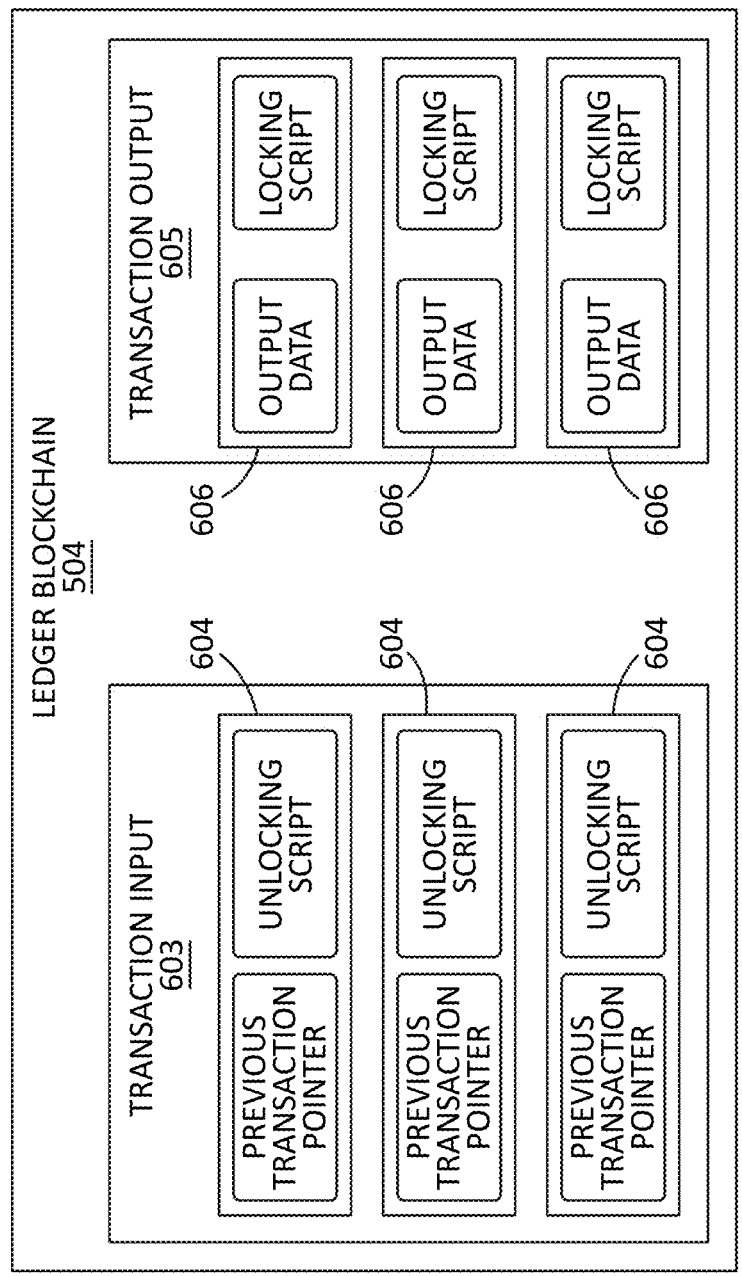
FIG. 6 is a block diagram illustrating a ledger transaction, such as is depicted in FIG. 5, in accordance with various embodiments of the present disclosure.

It is also useful to note the general structure of the transactions 504. Like many other transactions, at a conceptual level, each transaction 504 involves an input and an output (e.g., as shown in FIG. 6 below). Generally speaking, for a blockchain-based distributed ledger system, the output is metadata and locking conditions (specified in what is known as a locking script (e.g., as shown in FIG. 6 below) that must be satisfied to decrypt the associated underlying data. The input, then, is the identity of a previous transaction and data satisfying its associated locking condition.

FIG. 6 is a simplified schematic of the structure of a ledger transaction 504. As shown by the figure, a ledger transaction 504 includes a transaction input 603 and a transaction output

605. The transaction is the source of data and metadata for use in the output while the output specifies new locking conditions and metadata for (a part of) the identified source data. More formally, the transaction input 603 includes one or more input tuples 604. In turn, each input tuple 604 has a previous transaction pointer and an unlocking script. The previous transaction pointer of an input tuple 604 identifies a previous transaction whose output has not yet been spent while the unlocking script satisfies the unlock conditions specified by that previous transaction. Similarly, the transaction output 605 includes one or more output tuples 606. In turn, each output tuple 606 has an output data and a locking script. The output data identifies various metadata while the locking script identifies lock conditions for the associated encrypted data to be used in a future transaction.

Thus, a transaction does not necessarily involve an "account" or "address" and, in general, neither does the overall ledger architecture 402. Rather, in some embodiments, all that changes is the unlocking condition needed to access the associated data as input to a future transaction. That said, however, many locking scripts (and their associated unlocking scripts) do give rise to something closely analogous to an account or address. Specifically, a common locking script requirement is use of a private key corresponding to a public key listed in the locking script. These locking scripts are often called "pay-to-public-key" (or just "to-public-key") locking scripts. More precisely, the locking script usually lists a public key and requires that a future referencing transaction produce (in its unlocking script) a hash of the new transaction encrypted by the public key's corresponding private key (called a "signature"). Because of the nature of public-private key cryptography, producing an encrypted hash that, when decrypted by the public key, yields the correct hash for the new transaction generally requires possession of the associated private key. Thus, to verify the requirement is met, one first independently generates a hash of the proposed new transaction. One then decrypts the provided signature with the public key listed in the locking script and compares the two hashes. A match means the locking script is satisfied.

The public key specified in a "pay-to-public-key" locking script gives rise to the notion of an identifier (or just an "address"). One reason is that the public key is essentially unique to its corresponding private key. Because of certain mathematical properties of asymmetric cryptography, it is computationally infeasible to generate a public-private key pair with the public key having a specific desired value. Therefore, a given public key has one corresponding private key and, so long as the private key has not been leaked, has a one-to-one correspondence with some controlling entity. This is similarly analogous to an address or account number, which usually uniquely identifies a recipient.

A similar concept known as a "multi-signature address" arises from the use of locking scripts similar to a "pay-to-public-key" locking script with the change of their being multiple public-keys listed. These locking scripts (referred to here as a "pay-to-public-keys" locking script) list several public keys and require the production of a certain number of signatures from corresponding private keys. Thus, the process is essentially the same as with the a "pay-to-public-key" locking script except that multiple private keys are used to make multiple signatures that each must be a match for a listed private key for the locking script condition to be satisfied. The idea of the "multi-signature address" again arises from the combination of the listed public keys or from some derivate derived from them.

Note that, for a "pay-to-public-keys" locking script (i.e., for a multi-signature address), the number of signatures required can be less than the number of listed private keys. For example, a "pay-to-public-keys" locking script may list 7 public keys but specify that production of signatures corresponding to four (or more) of those public keys is sufficient.

Figure 7:
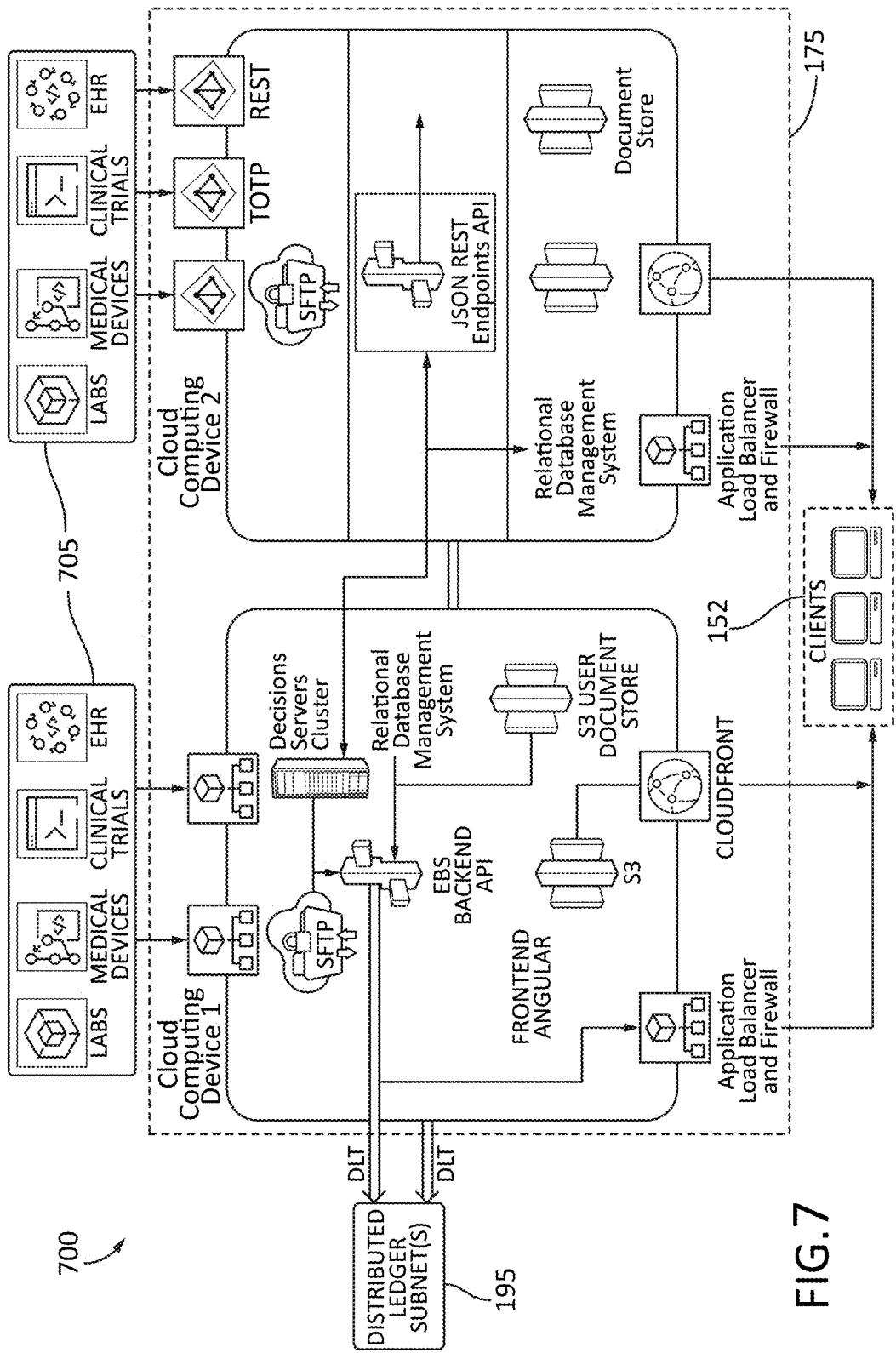
FIG. 7 illustrates an example system architecture used to carry out the operations discussed herein, in accordance with various embodiments of the present disclosure.

Referring now to FIG. 7, a system diagram 700 is shown in accordance with various embodiments for managing healthcare data. As shown, the system of FIG. 7 may be an extension of the environment shown in FIG. 1. For example, the computing device(s) 152, the data management system 175, the distributed ledger subnet(s) 195, and/or the like. In various embodiments, the components and operations discussed herein may be carried out using different and/or multiple components of the environment shown in FIG. 1.

In various embodiments, the data management system 175 may use one or more cloud computing services, such as Amazon Web Services, Microsoft Azure, Google Cloud, and/or the like. As such, the data management system 175 may communicate with such cloud computing services via the network 100. In various embodiments, unless otherwise stated, the operations carried out by a cloud computing service may be considered as carried out by the data management system 175 (e.g., the data management system 175 may direct the processing completed by the cloud computing services). Additionally, the data management system 175 may include one or more cloud devices (e.g., supported by a cloud computing service). For example, any of the processing device(s) 256 and/or the memory device(s) 268 of the data management system 175 may be a processing device and/or memory device of a cloud computing device.

The data management system 175 may receive data packets 705 (e.g., a first data packet, a second data packet, a third data packet, etc.) with information relating to one or more users. The data packets may include health data, such as PII, PHI, and/or the like. Example data packets 705 may be received from various sources. For example, a data packet may be received from a lab (e.g., patient information, test results, etc.), a medical device (e.g., device information, device test readings, etc.), a clinical trial (e.g., participants, results, etc.), an electronic health record (EHR), and/or the like. As discussed herein, health data is merely an example area of data in which the operations discussed herein may be used. As such, the data packets may be received from various different sources and processed by the data management system 175.

The data management system 175 may receive and process the data packets 705 as discussed herein. As such, the data management system 175 may receive the data packets 705, determine a data type (e.g., PII, PHI, platform, etc.) for the data packets and determine one or more users associated with the data packets. The data management system 175 may include multiple cloud computing devices (e.g., provided via multiple cloud computing services). For example, FIG. 7 illustrates two cloud computing devices operating together to carry out the operations herein. Alternatively, a single cloud computing device, such as the device shown in FIG. 8, may carry out the operations discussed herein. In some embodiments, non-cloud computing devices may be used in place or in communication with the cloud computing devices. For example, the data management system 175 may be a dedicated computing device.

In various embodiments, the data management system 175 may encrypt the data packets 705. The encrypted data packets may be stored in a database (e.g., data management database(s) 205). The data management database(s) 205 may be local (e.g., stored locally) or stored via the cloud or otherwise remote from the data management system 175. In various embodiments, the encrypted data packets may be viewable in the database as encrypted (e.g., the encrypted values may be displayed within the database).

One or more of the encryption keys used to encrypt the data packets may be stored as a record on one of the distributed ledger subnet(s) 195. In various embodiments, the data management system 175 and/or the distributed ledger subnet(s) 195 may generate a record for each data packet (or multiple records for each data packet in an instance in which the data packet includes information relating to multiple users). In various embodiments, the record generated may include a transaction identifier and a universally unique identifier. The universally unique identifier is associated with the user and used to encrypt (and decrypt) the data packets associated with the user. As such, each data packet is encrypted using the UUID associated with the user as the encryption key.

The data management system 175 is in communication with the distributed ledger subnet(s) 195 (e.g., via the network 100). The data management system 175 may send information to and receive information from the distributed ledger subnet(s) 195. As such, the data management system 175 may determine the distributed ledger subnet(s) 195 to send and/or receive specific information. Operations relating to sending and/or receiving information relating to the distributed ledger subnets are discussed herein, such as in reference to FIG. 11.

The data management system 175 may also receive and/or transfer information to computing device(s) 152. The computing device(s) 152 may be associated with a client of the entity associated with the data management system 175. For example, the computing device(s) 152 may be associated with an organization completing a clinical trial and receives data from the data management system 175 associated with users in the given clinical trial. As such, the term "client" is in reference to clients of an entity associated with the data management system 175. The computing device(s) 152 may request data associated with one or more users (e.g., associated with one or more users in a clinical trial). The request may be approved by the given user (e.g., the user may have given approval upon signing up for clinical trial). The system may then perform the operations herein to decrypt the data packets requested by the computing device(s) 152 and provide the non-encrypted values to the computing device(s) 152.

Figure 8:
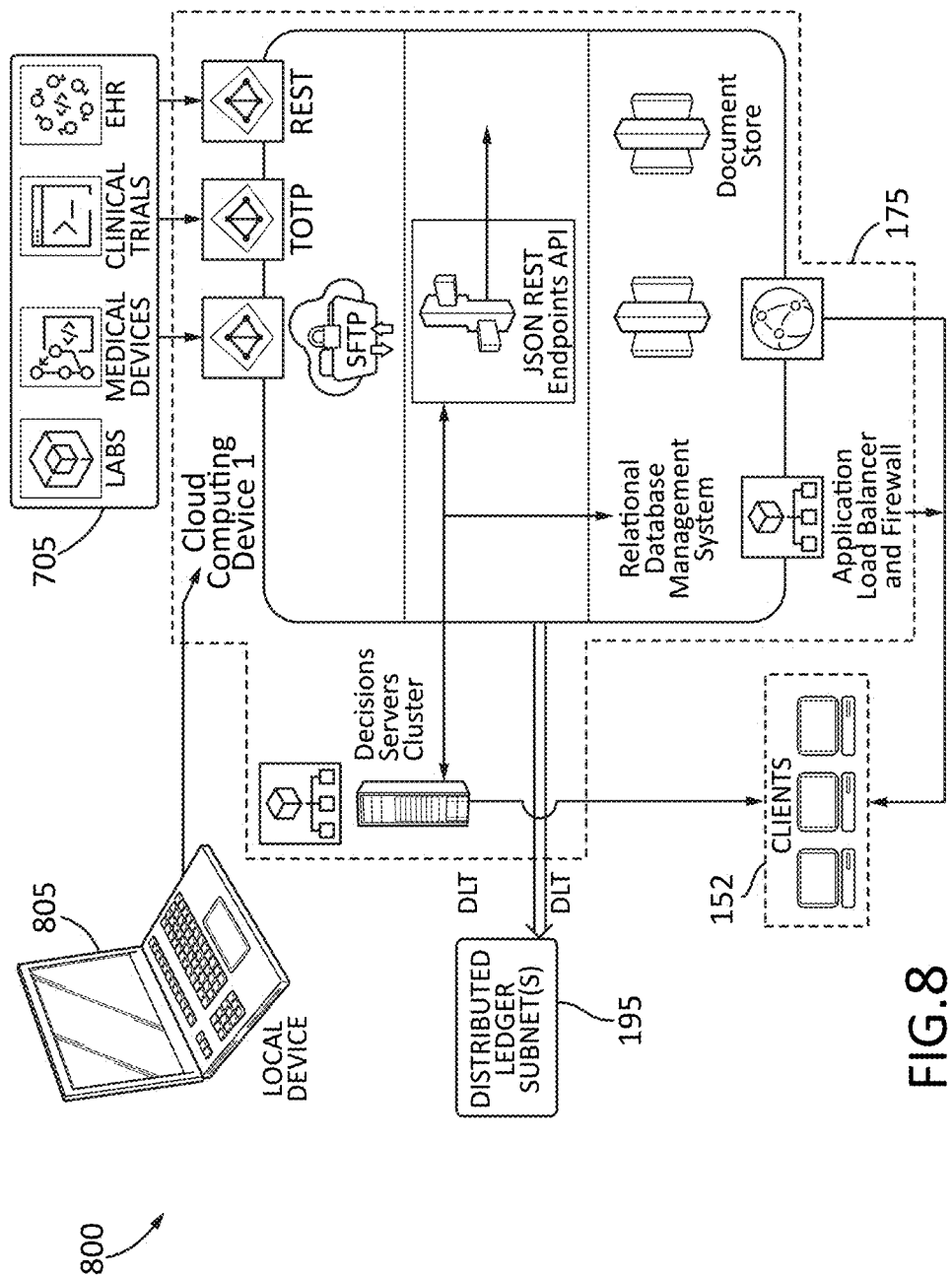
FIG. 8 illustrates another example system architecture used to carry out the operations discussed herein, in accordance with various embodiments of the present disclosure.

Referring now to FIG. 8, another example system diagram 800 is shown used in various embodiments discussed herein. FIG. 8 may generally include the same or similar components to FIG. 7. As shown, compared to FIG. 7, the system of FIG. 8 may include less components to carry out the operations. As shown, the system of FIG. 8 may be an extension of the environment shown in FIG. 1. For example, the computing device(s) 152, the data management system 175, the distributed ledger subnet(s) 195, and/or the like.

In various embodiments, the components and operations discussed herein may be carried out using different and/or multiple components of the environment shown in FIG. 1. In various embodiments, the data management system 175 may use one or more cloud computing services, such as Amazon Web Services, Microsoft Azure, Google Cloud, and/or the like. As such, the data management system 175 may communicate with such cloud computing services via the network 100. In various embodiments, unless otherwise stated, the operations carried out by a cloud computing service may be considered as carried out by the data management system 175 (e.g., the data management system 175 may direct the processing completed by the cloud computing services). Additionally, the data management system 175 may include one or more cloud devices (e.g., supported by a cloud computing service). For example, any of the processing device(s) 256 and/or the memory device(s) 268 of the data management system 175 may be a processing device and/or memory device of a cloud computing device.

In the system diagram 800 of FIG. 8, a single cloud computing device is shown within the data management system 175. A local device 805 may be provided to assist the cloud computing device or otherwise carry out the operations of the data management system 175. As such, the local device 805 may be part of the data management system 175. For example, the local device may include the processing device(s) 256 and the memory device(s) 268 shown in FIG. 2.

Figure 9:
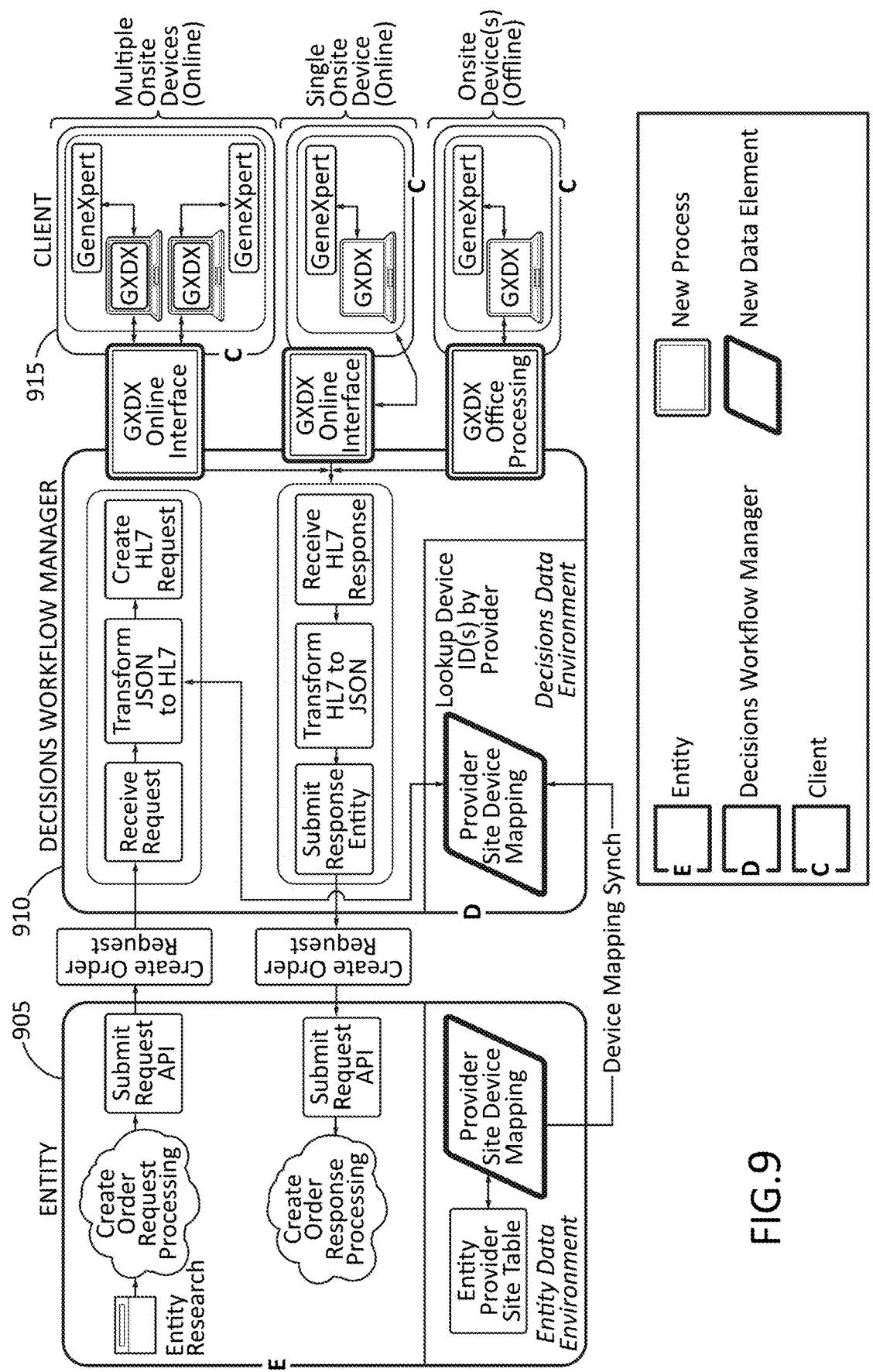
FIG. 9 is a diagram illustrating an example decision workflow used to process and use the operations discussed herein, in accordance with various embodiments of the present disclosure.

Referring now to FIG. 9, a diagram illustrating an example decision workflow used to process and use the operations discussed is shown. The diagram illustrates the decision workflow to carry out the operations discussed herein. Unless otherwise noted, each of the workflows discussed in reference to FIG. 9 may be carried out by the components of the system shown in FIG. 1. For example, the entity portion 905 of the diagram and/or the decision workflow manager portion 910 of the diagram may be carried out by the data management system 175. Additionally, the client portion 915 of the diagram may be carried out by computing device(s) 152.

As shown, the entity portion 905 may include creating entity order request processing. The request is submitted and the decision workflow manager portion details the operations to fulfill such a request. The operations shown in FIG. 9 correspond to the operations discussed in reference to FIG. 11. For example, the request may be a request for data relating to a given user. The decision workflow manager portion 910 is in communication with the computing device(s) 152 (shown in the client portion 915). A portal or other user interface may be provided to the computing device(s) 152 to access information discussed herein.

Figure 10A:
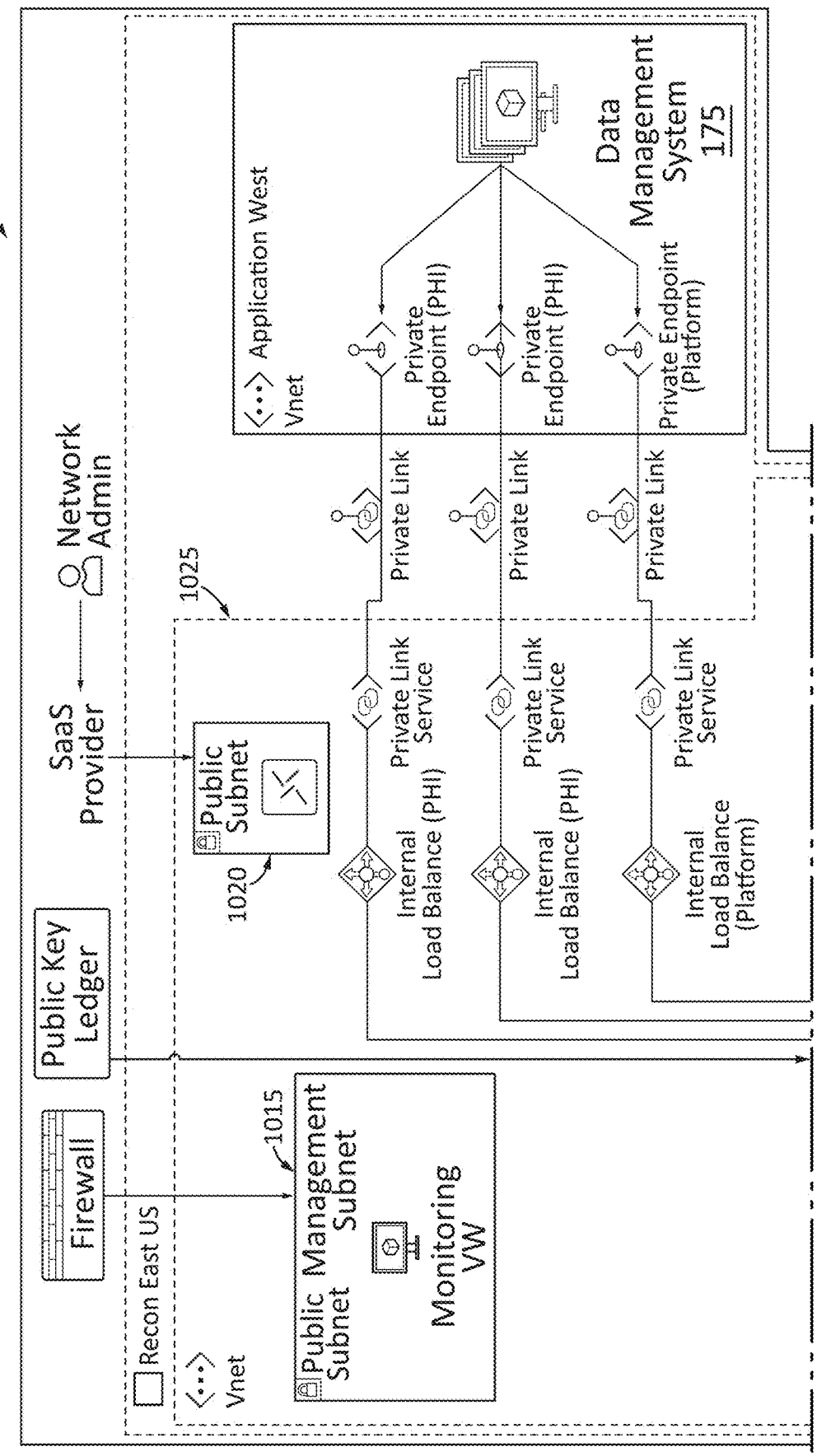
FIGS. 10A and 10B illustrate another example system diagram in accordance with various embodiments of the present disclosure.
Figure 10B:
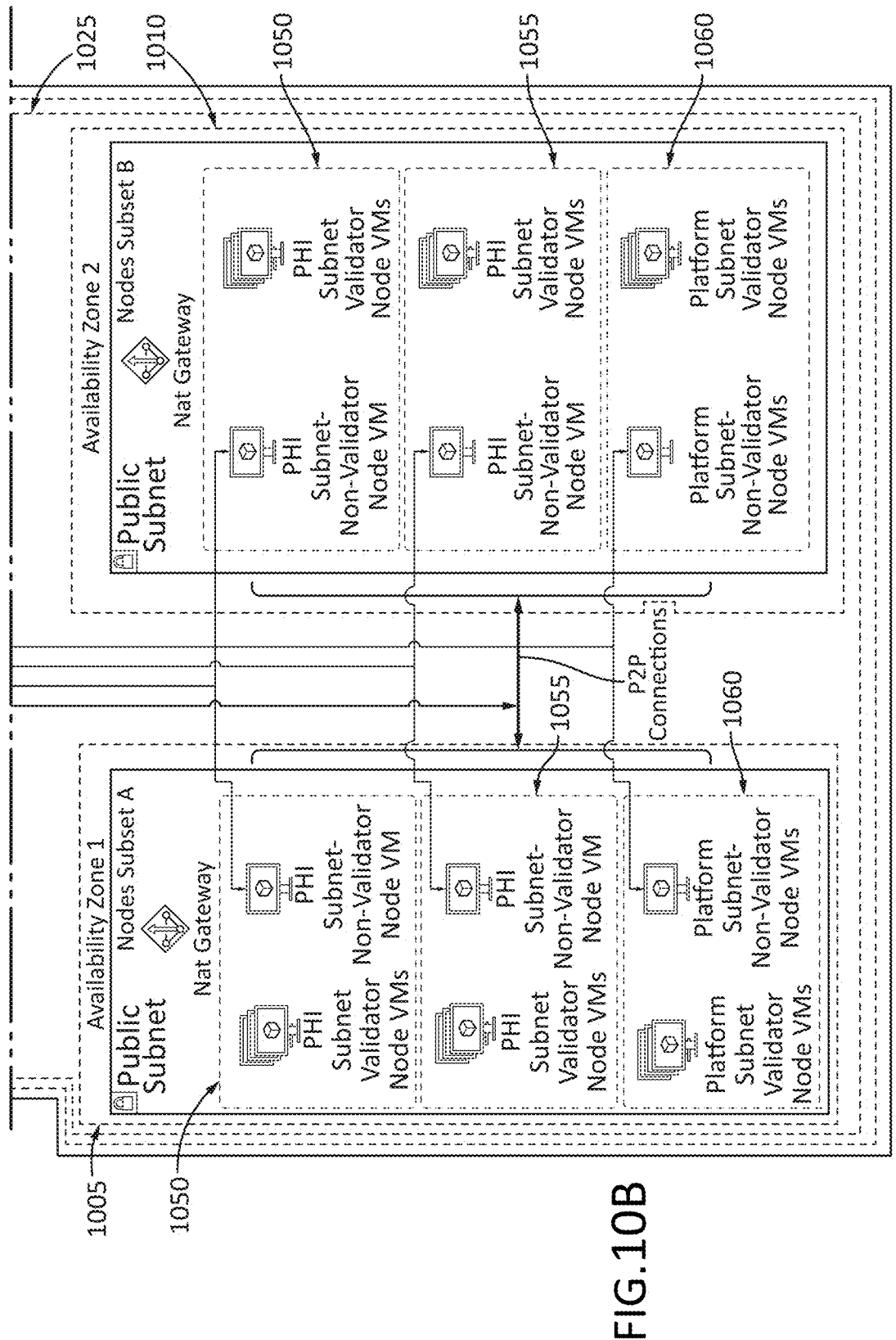

Referring now to FIGS. 10A and 10B, an example structure 1000 of distributed ledger subnets is shown. In the example shown in FIGS. 10A and 10B, the distributed ledger subnets include a nodes subnet A 1005, a nodes subnet B 1010, a management subnet 1015, and a SAAS public subnet 1020. The number of subnets and structure are merely an example and any number of subnets may be provided. Additionally, as shown, the distributed ledger subnets are shown as part of a singular distributed ledger 1025. However, the distributed ledger subnets may be distributed across multiple distributed ledgers. Each of the distributed ledger subnets may be public subnets.

Each of the nodes subnet A 1005 and the nodes subnet B 1010 are further segmented into subnets based on the data type of the data being stored. As shown, the nodes subnet A 1005 includes a PII subnet 1050, a PHI subnet 1055, and a Platform subnet 1060. As such, the segmented subnet (PII subnet, PHI subnet, platform subnet, etc.) are the distributed ledger subnets in which the operations herein discuss. For example, as discussed in the method of FIG. 11, any of the PII subnet, the PHI subnet, or the platform subnet may be the first distributed ledger subnet. Various other subnets may be contemplated based on the various data types of data processed by the system. Additionally, the individual subnets (e.g., PII subnet, PHI subnet, platform subnet, etc.) that are distributed across multiple distributed ledger subnets (e.g., nodes subnet A 1005 and the nodes subnet B 1010) may be considered a singular subnet. For example, the PII subnet 1050 shown in nodes subnet A 1005 may be considered the same as the PII subnet 1050 shown in the nodes subnet B 1010. Alternatively, the subnets may be further segmented (e.g., based on region, patient information, etc.).

As shown in FIGS. 10A and 10B, the data management system 175 may be in communication with the various distributed ledger subnets, such that the data management system 175 may transmit and/or receive information from the various distributed ledger subnets. For example, the data management system 175 may be in communication with the distributed ledger subnets to carry out the operations of FIG. 11.

Figure 11:
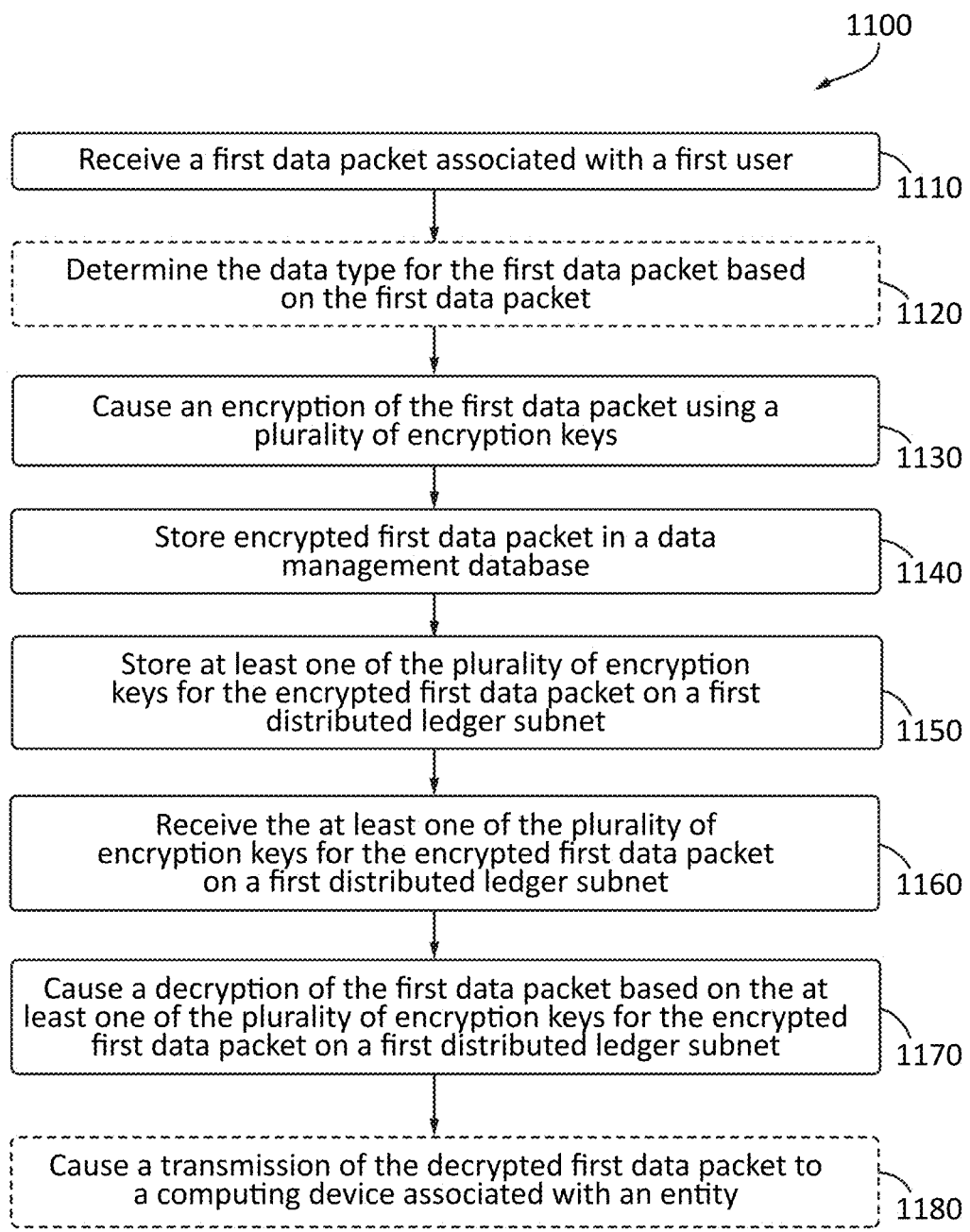
FIG. 11 provides a flowchart 1100 illustrating a method of managing healthcare data, in accordance with various embodiments of the present disclosure.

Referring now to FIG. 11, a flowchart 1100 is illustrated for managing health data, in accordance with various embodiments. In various embodiments, the method of FIG. 11 may be carried out using processing device(s), such as a processing device within the data management system 175 and/or one or more computing device(s) 152. As such, the operations herein may be carried out by any of the embodiments herein unless otherwise stated. Unless otherwise stated, the operations of FIG. 11 may be carried out by the same system, such as the systems of various embodiments discussed herein.

While the operations herein are discussed in reference to first, second, third (e.g., a first data packet, a first user, a first distributed ledger subnet, etc.), the terms are not necessarily chronological (e.g., a first data packet need not be received before a second data packet) or sequential (e.g., a first user need not be before a second user) unless otherwise noted. Additionally, the operations carried out on a first data packet may be carried out on additional data packets (e.g., a second data packet, a third data packet, etc.). Various data packets may be associated with different users (e.g., a first user, a second user, a third user, etc.). Unless otherwise noted, the operations discussed herein may be carried out for any number of different data packets, users, distributed subnets, and/or the like.

Referring now to Block 1110 of FIG. 11, the method includes receiving a first data packet associated with a first user. A data packet (e.g., a first data packet, a second data packet, etc.) may be any data format. For example, a data packet may a document that includes information relating to a user (e.g., a first user, a second user, etc.). In various embodiments, a data packet (e.g., the first data packet) may be associated with a user (e.g., a first user, a second user, etc.). The association of the given data packet may be based on the information in the given data packet (e.g., the name of the user or other identifier may be included in the given data packet).

In various embodiments, the first data packet is assigned a universally unique identifier based on the first user. The first data packet may include the UUID based on the first user and/or the system may determine the UUID for the first data packet based on the determination of the user associated with the given data packet. Each user (e.g., a first user, a second user, etc.) on a system may receive a distinct UUID that is different than the UUID for other users.

Referring now to optional Block 1120 of FIG. 11, the method includes determining the data type for the first data packet based on the first data packet. The data type may include various segments of the total data received by a system. For example, in the health data context, the data types may include PII data (personally identifiable information), PHI data (protected health information), platform data (e.g., test results).

The data in a data packet may include one or more of each type of data. As such, the data packet may be subdivided into individual data types. For example, a data packet may be divided into segments between PII, PHI, and platform data. In various embodiments, some data may be considered multiple different data types. For example, a name may be considered both PII and PHI. In such an instance, the data may be designated as one or both data types. As such, the data packet may be processed and information relating to the given data packet may be stored on the PII subnet and the PHI subnet.

In various embodiments, as discussed herein, the distributed ledger subnet in which information about the given data packet is stored is determined based on the data type of the given data packet. As such, the first distributed ledger subnet is determined based on the data type of the first data packet. For example, in an instance in which the first data packet includes PII, the PII subnet may be determined as the first distributed ledger subnet as discussed herein.

Referring now to Block 1130 of FIG. 11, the method includes causing an encryption of the first data packet using a plurality of encryption keys. The encryption of the given data packets is discussed in more detail in any of the references incorporated by reference herein. In various embodiments, at least one of the plurality of encryption keys is based on the universally unique identifier. For example, the UUID associated with the first user may be used to encrypt any data packets associated with the first user. As such, the UUID for the first user is used along with additional encryption keys to create the hash that encrypts the given data packets. In various embodiments, the UUID may be used with two other encryption keys to encrypt the given data packet. In an example in which the UUID associated with the first user may be used to encrypt any data packets, the UUID may be used as an encryption key for an encryption algorithm (e.g., a AES-256 encryption algorithm). Additional encryption keys (e.g., of the plurality of the encryption keys) may also be used as encryption keys in the same or different encryption algorithms. For example, the transaction ID for the given data packet may be used as an encryption key for the encryption of the given data packet.

Referring now to optional Block 1140 of FIG. 11, the method includes storing the encrypted first data packet in a data management database. The encrypted value created upon encryption of a data packet may be stored off-chain (e.g., distinct from the distributed ledger subnets). The encrypted value may be stored along with other encrypted values in a table or other spreadsheet format. In various embodiments, the data management database may be stored locally or otherwise accessible by the data management system 175. Upon viewing of the encrypted values, an actor would not be able to decrypt the values without the exact information stored on the distributed ledger subnet, as discussed in more detail in reference to Block 1150 of FIG. 11.

Referring now to Block 1150 of FIG. 11, the method includes storing at least one of the plurality of encryption keys for the encrypted first data packet on a first distributed ledger subnet. In various embodiments, the system may include a plurality of distributed ledger subnets. As such, the first distributed ledger subnet is determined from the plurality of distributed ledger subnets. In various embodiments, each of the plurality of distributed ledger subnets contains information relating to a different data type. For example, the distributed ledger subnets may include a PII subnet, a PHI subnet, a platform subnet, and/or the like. In various embodiments, the system may generate the various distributed ledger subnets. The number of distributed ledger subnets may be based on the number of distinct data types to be used.

In various embodiments, the at least one of the plurality of encryption keys for the encrypted first data packet stored on the first distributed ledger subnet is stored as a node on the first distributed ledger subnet. For example, the encryption key of the encrypted first data packet stored on the first distributed ledger subnet may the UUID for the first user. In various embodiments, each data packet represented on the given distributed ledger subnet may be an individual node. Each node may include a transaction identifier. The transaction identifier is generated for each data packet and may be used to determine which node is being requested to be provided as discussed herein.

Referring now to Block 1160 of FIG. 11, the method includes receiving the at least one of the plurality of encryption keys for the encrypted first data packet stored on the first distributed ledger subnet. In various embodiments, to decrypt the given data packet, the information stored on the given distributed ledger subnet may be retrieved. As such, the data management system 175 may request the information for a given data packet (e.g., the first data packet). The request may include the transaction identifier or other information in order to determine the specific node on the given distributed ledger subnet. As such, the data management system 175 may receive the information stored on the given distributed ledger subnet (e.g., the UUID associated with the given user). For example, the data management system 175 may receive the UUID associated with the given user and use the UUID along with one or more other encryption keys to decrypt the given data packet. Additional encryption keys (e.g., the transaction ID associated with the given data packet) may also be stored on the given distributed ledger subnet and retrieved along with the UUID.

Referring now to Block 1170 of FIG. 11, the method includes causing a decryption of the first data packet based on the at least one of the plurality of encryption keys for the encrypted first data packet stored on the first distributed ledger subnet. In various embodiments, the decryption of the first data packet may cause the first data packet to be viewable in the same format as before the encryption of Block 1130 of FIG. 11. The decryption may be allowed by obtaining each of the encryption keys used. As with encryption, the decryption of the given data packets is discussed in more detail in any of the references incorporated by reference herein. The system herein may use any methods discussed in the given references.

Referring now to optional Block 1180 of FIG. 11, the method includes causing a transmission of the decrypted first data packet to a computing device associated with an entity. In various embodiments, a computing device associated with the entity may be one of the computing device(s) 152. In various embodiments, the computing device associated with the entity may submit a request for the first data packet associated with the first user. In such an instance, the entity may submit a request, the first user may approve the request (e.g., either having already provided approval or providing real-time approval), and the system may perform the operations herein to provide the first data packet to the computing device associated with the entity.

In various embodiments, the computing device associated with the entity may request multiple data packets associated with the same user (or different users). In such an instance, the method may include providing multiple data packets to the computing device associated with the entity. For example, a clinical trial may request information relating to one or more users in a given study and the operations herein may be used to provide such information to the computing device associated with the entity.

In various embodiments, the operations may be repeated for additional data packets (e.g., a second data packet, a third data packet, etc.) associated with users (e.g., the first user, a second user, a third user, etc.). As such, the given data packet may be encrypted and information relating to the given data packet may be stored on a distributed ledger subnet. In various embodiments, the same distributed ledger subnet (e.g., a first distributed ledger subnet) may include information relating to multiple data packets of the same data type regardless of the user associated with the data packet. For example, in an instance in which a second data packet shares the same data type as the first data packet, the second data packet may be encrypted and the information relating to encryption may be transmitted to the same distributed ledger subnet.

In some embodiments, a non-transitory computer-readable storage medium including instructions is also provided, and the instructions may be executed by a device, for performing the above-described methods. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same. The device may include one or more processors (CPUs), an input/output interface, a network interface, and/or a memory.

The devices, modules, and other functional units described in this disclosure can be implemented by hardware, or software, or a combination of hardware and software. In some embodiments, functions described as being implemented in hardware may instead be implemented in software or a combination of hardware and software. Likewise, in some embodiments, functions described as being implemented in software may instead be implemented in hardware or a combination of hardware and software. If something is implemented by software, it may be stored in a non-transitory computer-readable media, like the computer-readable media described above. Such software, when executed by a processor, may perform the function of the device, module or other functional unit the software is implementing. The above-described devices, modules, and other functions units may also be combined or may be further divided into a plurality of sub-units.

In some places reference is made to standards, including standards describing methods of performing various tasks. These standards are revised from time to time, and, unless explicitly stated otherwise, reference to standards in this disclosure refer to the most recent published standard as of the time of filing.

Spatially relative terms, such as "under", "below", "lower", "over", "upper" and the like, may be used herein for ease of description to describe one element or feature's relationship to another when the apparatus is right side up.

When a feature is referred to as being "on" another feature, the feature may be directly on the other feature with no intervening features present or it may be indirectly on the other feature with intervening features being present. In contrast, when a feature is referred to as being "directly on" another feature, the feature is directly on the other feature with no intervening features present. It will also be understood that, when a feature is referred to as being "connected", "attached" or "coupled" to another feature, the feature may be directly connected, attached or coupled to the other feature with no intervening features present or it may be indirectly connected, attached or coupled to the other feature with intervening features being present. In contrast, when a feature is referred to as being "directly connected", "directly attached" or "directly coupled" to another feature, the feature is directly connected, directly attached, or directly coupled to the other feature with not intervening features present.

The terms "about" and "approximately" shall generally mean an acceptable degree of error or variation for the quantity measured given the nature or precision of the measurements. Typical, exemplary degrees of error or variation are within 20%, preferably within 10%, more preferably within 5%, and still more preferably within 1% of a given value or range of values. Numerical quantities given in this description are approximate unless stated otherwise, meaning that the term "about" or "approximately" can be inferred when not expressly stated.

Ordinal numbers or terms such as "first" and "second" are used only to differentiate an entity or operation from another entity or operation, and do not require or imply any actual relationship or sequence between these entities or operations. Thus, a first feature or element could be termed a second feature or element, and similarly, a second feature or element could be termed a first feature or element without departing from the teachings of the present disclosure. Moreover, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items.

As used herein, unless specifically stated otherwise, the terms "or" and "at least one of" encompasses all possible combinations, except where infeasible. For example, if it is stated that a component may include "A or B," then, unless specifically stated otherwise or infeasible, the component may include "A," "B," or "A and B." As a second example, if it is stated that a component includes "at least one of A, B, or C," then, unless specifically stated otherwise or infeasible, the component may include "A," "B," "C," "A and B," "A and C," "B and C," or "A, B, and C." This same construction applies to longer lists (e.g., "may include A, B, C, or D").

As used herein, the singular forms "a", "an," and "the" are intended to include the plural forms as well, unless the context clearly indicates otherwise.

Any statements in this disclosure criticizing or disparaging aspects of the prior art are not intended to indicate that what is claimed excludes any of those criticized or disparaged aspects of the prior art.

Any given element or step of the embodiments disclosed above may be embodied in a single element or step or may be embodied in multiple elements or steps. Moreover, any given element or step of the embodiments disclosed above may be combined and embodied in single element or step or may be combined and embodied in multiple elements or steps.

The sequence of steps shown in the various figures are only for illustrative purposes and do not necessarily indicate that embodiments of the present disclosure are limited to any particular sequence of steps. As such, steps performed by various embodiments of the present disclosure can be performed in a different order while implementing the same method.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the disclosure disclosed herein. It is intended that the specification and examples be considered as exemplary only, with a true scope and spirit of the disclosure being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same method.

III. Claim Clauses

Clause 1. A system for managing health data, comprising: at least one non-transitory storage device; and at least one processing device coupled to the at least one non-transitory storage device, wherein the at least one processing device is configured to: receive a first data packet associated with a first user, wherein the first data packet is assigned a universally unique identifier based on the first user; cause an encryption of the first data packet using a plurality of encryption keys, wherein at least one of the plurality of encryption keys is based on the universally unique identifier; store at least one of the plurality of encryption keys for the encrypted first data packet on a first distributed ledger subnet, wherein the first distributed ledger subnet is determined based on a data type of the first data packet; receive the at least one of the plurality of encryption keys for the encrypted first data packet stored on the first distributed ledger subnet; and cause a decryption of the first data packet based on the at least one of the plurality of encryption keys for the encrypted first data packet stored on the first distributed ledger subnet.

Clause 2. The system of Clause 1, wherein the first distributed ledger subnet is one of a PII subnet, a PHI subnet, or a platform subnet.

Clause 3. The system of Clause 1, further comprising a plurality of distributed ledger subnets, wherein the first distributed ledger subnet is determined from the plurality of distributed ledger subnets.

Clause 4. The system of Clause 3, wherein each of the plurality of distributed ledger subnets contains information relating to a different data type.

Clause 5. The system of Clause 1, wherein the at least one processing device is further configured to determine the data type for the first data packet based on the first data packet.

Clause 6. The system of Clause 5, wherein the at least one processing device is further configured to determine the first distributed ledger subnet based on the data type of the first data packet.

Clause 7. The system of Clause 1, wherein the at least one processing device is further configured to generate the universally unique identifier based on the first user.

Clause 8. The system of Clause 1, wherein the at least one processing device is further configured to store the encrypted first data packet in a data management database.

Clause 9. The system of Clause 1, wherein the at least one processing device is further configured to: receive a second data packet associated with the first user; cause an encryption of the second data packet using the plurality of encryption keys, wherein at least one of the plurality of encryption keys is based on the universally unique identifier; and store at least one of the plurality of encryption keys for the encrypted second data packet on a second distributed ledger subnet, wherein the second distributed ledger subnet is determined based on a data type of the second data packet.

Clause 10. The system of Clause 9, wherein the at least one processing device is further configured to: receive the at least one of the plurality of encryption keys for the encrypted second data packet stored on the second distributed ledger subnet; and cause a decryption of the second data packet based on the at least one of the plurality of encryption keys for the encrypted second data packet stored on the second distributed ledger subnet.

Clause 11. The system of Clause 1, wherein the at least one processing device is further configured to: receive a second data packet associated with a second user, wherein the second data packet is assigned a universally unique identifier based on the second user; cause an encryption of the second data packet using a plurality of encryption keys, wherein at least one of the plurality of encryption keys is based on the universally unique identifier based on the second user; and store at least one of the plurality of encryption keys for the encrypted second data packet on the first distributed ledger subnet, wherein the first distributed ledger subnet is determined based on a data type of the second data packet, wherein the second data packet shares the data type with the first data packet.

Clause 12. The system of Clause 11, wherein the at least one processing device is further configured to: receive the at least one of the plurality of encryption keys for the encrypted second data packet stored on the first distributed ledger subnet; and cause a decryption of the second data packet based on the at least one of the plurality of encryption keys for the encrypted second data packet stored on the first distributed ledger subnet.

Clause 13. The system of Clause 3, wherein the at least one processing device is further configured to generate each of a plurality of distributed ledger subnets, wherein each of the plurality of distributed ledger subnet are dedicated to a specific data type.

Clause 14. The system of Clause 1, wherein the at least one processing device is further configured to cause a transmission of the decrypted first data packet to a computing device associated with an entity.

Clause 15. The system of Clause 1, wherein the at least one processing device is further configured to receive a request for the first data packet associated with the first user.

Clause 16. The system of Clause 15, wherein the request for the first data packet associated with the first user is approved by the first user.

Clause 17. The system of Clause 1, wherein the at least one of the plurality of encryption keys for the encrypted first data packet stored on the first distributed ledger subnet is stored as a node on the first distributed ledger subnet.

Clause 18. The system of Clause 17, wherein the at least one of the plurality of encryption keys for the encrypted first data packet stored on the first distributed ledger subnet is the universally unique identifier based on the first user.

Clause 19. The system of Clause 1, wherein the universally unique identifier based on the first user is combined with each of the plurality of encryption keys to generate a decryption key.

Clause 20. The system of Clause 1, wherein a transaction identifier is generated for the first data packet, wherein the transaction identifier is stored on the first distributed ledger subnet.

Clause 21. A method for managing health data, comprising: receiving a first data packet associated with a first user, wherein the first data packet is assigned a universally unique identifier based on the first user; causing an encryption of the first data packet using a plurality of encryption keys, wherein at least one of the plurality of encryption keys is based on the universally unique identifier; storing at least one of the plurality of encryption keys for the encrypted first data packet on a first distributed ledger subnet, wherein the first distributed ledger subnet is determined based on a data type of the first data packet; receiving the at least one of the plurality of encryption keys for the encrypted first data packet stored on the first distributed ledger subnet; and causing a decryption of the first data packet based on the at least one of the plurality of encryption keys for the encrypted first data packet stored on the first distributed ledger subnet.

Clause 22. The method of Clause 21, wherein the first distributed ledger subnet is one of a PII subnet, a PHI subnet, or a platform subnet.

Clause 23. The method of Clause 21, wherein the first distributed ledger subnet is determined from a plurality of distributed ledger subnets.

Clause 24. The method of Clause 23, wherein each of the plurality of distributed ledger subnets contains information relating to a different data type.

Clause 25. The method of Clause 21, further comprising determining the data type for the first data packet based on the first data packet.

Clause 26. The method of Clause 25, further comprising determining the first distributed ledger subnet based on the data type of the first data packet.

Clause 27. The method of Clause 21, further comprising generating the universally unique identifier based on the first user.

Clause 28. The method of Clause 21, further comprising storing the encrypted first data packet in a data management database.

Clause 29. The method of Clause 21, further comprising: receiving a second data packet associated with the first user; causing an encryption of the second data packet using the plurality of encryption keys, wherein at least one of the plurality of encryption keys is based on the universally unique identifier; and storing at least one of the plurality of encryption keys for the encrypted second data packet on a second distributed ledger subnet, wherein the second distributed ledger subnet is determined based on a data type of the second data packet.

Clause 30. The method of Clause 29, further comprising: receiving the at least one of the plurality of encryption keys for the encrypted second data packet stored on the second distributed ledger subnet; and causing a decryption of the second data packet based on the at least one of the plurality of encryption keys for the encrypted second data packet stored on the second distributed ledger subnet.

Clause 31. The method of Clause 21, further comprising: receiving a second data packet associated with a second user, wherein the second data packet is assigned a universally unique identifier based on the second user; causing an encryption of the second data packet using a plurality of encryption keys, wherein at least one of the plurality of encryption keys is based on the universally unique identifier based on the second user; and storing at least one of the plurality of encryption keys for the encrypted second data packet on the first distributed ledger subnet, wherein the first distributed ledger subnet is determined based on a data type of the second data packet, wherein the second data packet shares the data type with the first data packet.

Clause 32. The method of Clause 31, further comprising: receiving the at least one of the plurality of encryption keys for the encrypted second data packet stored on the first distributed ledger subnet; and causing a decryption of the second data packet based on the at least one of the plurality of encryption keys for the encrypted second data packet stored on the first distributed ledger subnet.

Clause 33. The method of Clause 23, wherein the at least one processing device is further configured to generate each of a plurality of distributed ledger subnets, wherein each of the plurality of distributed ledger subnet are dedicated to a specific data type.

Clause 34. The method of Clause 21, further comprising causing a transmission of the decrypted first data packet to a computing device associated with an entity.

Clause 35. The method of Clause 21, further comprising receiving a request for the first data packet associated with the first user.

Clause 36. The method of Clause 35, wherein the request for the first data packet associated with the first user is approved by the first user.

Clause 37. The method of Clause 21, wherein the at least one of the plurality of encryption keys for the encrypted first data packet stored on the first distributed ledger subnet is stored as a node on the first distributed ledger subnet.

Clause 38. The method of Clause 37, wherein the at least one of the plurality of encryption keys for the encrypted first data packet stored on the first distributed ledger subnet is the universally unique identifier based on the first user.

Clause 39. The method of Clause 21, wherein the universally unique identifier based on the first user is combined with each of the plurality of encryption keys to generate a decryption key.

Clause 40. The method of Clause 21, wherein a transaction identifier is generated for the first data packet, wherein the transaction identifier is stored on the first distributed ledger subnet.

Clause 41. A computer program product for managing health data, the computer program product comprising at least one non-transitory computer-readable medium having one or more computer-readable program code portions embodied therein, the one or more computer-readable program code portions comprising at least one executable portion configured to: receive a first data packet associated with a first user, wherein the first data packet is assigned a universally unique identifier based on the first user; cause an encryption of the first data packet using a plurality of encryption keys, wherein at least one of the plurality of encryption keys is based on the universally unique identifier; store at least one of the plurality of encryption keys for the encrypted first data packet on a first distributed ledger subnet, wherein the first distributed ledger subnet is determined based on a data type of the first data packet; receive the at least one of the plurality of encryption keys for the encrypted first data packet stored on the first distributed ledger subnet; and cause a decryption of the first data packet based on the at least one of the plurality of encryption keys for the encrypted first data packet stored on the first distributed ledger subnet.

Clause 42. The computer program product of Clause 41, wherein the first distributed ledger subnet is one of a PII subnet, a PHI subnet, or a platform subnet.

Clause 43. The computer program product of Clause 41, wherein the first distributed ledger subnet is determined from the plurality of distributed ledger subnets.

Clause 44. The computer program product of Clause 43, wherein each of the plurality of distributed ledger subnets contains information relating to a different data type.

Clause 45. The computer program product of Clause 41, wherein the one or more computer-readable program code portions comprise at least one executable portion further configured to determine the data type for the first data packet based on the first data packet.

Clause 46. The computer program product of Clause 45, wherein the one or more computer-readable program code portions comprise at least one executable portion further configured to determine the first distributed ledger subnet based on the data type of the first data packet.

Clause 47. The computer program product of Clause 41, wherein the one or more computer-readable program code portions comprise at least one executable portion further configured to generate the universally unique identifier based on the first user.

Clause 48. The computer program product of Clause 41, wherein the one or more computer-readable program code portions comprise at least one executable portion further configured to store the encrypted first data packet in a data management database.

Clause 49. The computer program product of Clause 41, wherein the one or more computer-readable program code portions comprise at least one executable portion further configured to: receive a second data packet associated with the first user; cause an encryption of the second data packet using the plurality of encryption keys, wherein at least one of the plurality of encryption keys is based on the universally unique identifier; and store at least one of the plurality of encryption keys for the encrypted second data packet on a second distributed ledger subnet, wherein the second distributed ledger subnet is determined based on a data type of the second data packet.

Clause 50. The computer program product of Clause 49, wherein the one or more computer-readable program code portions comprise at least one executable portion further configured to: receive the at least one of the plurality of encryption keys for the encrypted second data packet stored on the second distributed ledger subnet; and cause a decryption of the second data packet based on the at least one of the plurality of encryption keys for the encrypted second data packet stored on the second distributed ledger subnet.

Clause 51. The computer program product of Clause 41, wherein the one or more computer-readable program code portions comprise at least one executable portion further configured to: receive a second data packet associated with a second user, wherein the second data packet is assigned a universally unique identifier based on the second user; cause an encryption of the second data packet using a plurality of encryption keys, wherein at least one of the plurality of encryption keys is based on the universally unique identifier based on the second user; and store at least one of the plurality of encryption keys for the encrypted second data packet on the first distributed ledger subnet, wherein the first distributed ledger subnet is determined based on a data type of the second data packet, wherein the second data packet shares the data type with the first data packet.

Clause 52. The computer program product of Clause 51, wherein the one or more computer-readable program code portions comprise at least one executable portion further configured to: receive the at least one of the plurality of encryption keys for the encrypted second data packet stored on the first distributed ledger subnet; and cause a decryption of the second data packet based on the at least one of the plurality of encryption keys for the encrypted second data packet stored on the first distributed ledger subnet.

Clause 53. The computer program product of Clause 43, wherein the one or more computer-readable program code portions comprise at least one executable portion further configured to generate each of a plurality of distributed ledger subnets, wherein each of the plurality of distributed ledger subnet are dedicated to a specific data type.

Clause 54. The computer program product of Clause 41, wherein the one or more computer-readable program code portions comprise at least one executable portion further configured to cause a transmission of the decrypted first data packet to a computing device associated with an entity.

Clause 55. The computer program product of Clause 41, wherein the one or more computer-readable program code portions comprise at least one executable portion further configured to receive a request for the first data packet associated with the first user.

Clause 56. The computer program product of Clause 55, wherein the request for the first data packet associated with the first user is approved by the first user.

Clause 57. The computer program product of Clause 41, wherein the at least one of the plurality of encryption keys for the encrypted first data packet stored on the first distributed ledger subnet is stored as a node on the first distributed ledger subnet.

Clause 58. The computer program product of Clause 57, wherein the at least one of the plurality of encryption keys for the encrypted first data packet stored on the first distributed ledger subnet is the universally unique identifier based on the first user.

Clause 59. The computer program product of Clause 41, wherein the universally unique identifier based on the first user is combined with each of the plurality of encryption keys to generate a decryption key.

Clause 60. The computer program product of Clause 41, wherein a transaction identifier is generated for the first data packet, wherein the transaction identifier is stored on the first distributed ledger subnet.

Clause 61. A system for managing health data, comprising: a data management system, wherein the data management system comprises at least one cloud computing device; at least one distributed ledger comprising a plurality of distributed ledger subnets, wherein the plurality of distributed ledger subnets is segmented based on data type; and a network creating a connection between the data management system and the at least one distributed ledger, wherein the data management system comprises: at least one non-transitory storage device; and at least one processing device coupled to the at least one non-transitory storage device, wherein the at least one processing device is configured to: receive a first data packet associated with a first user, wherein the first data packet is assigned a universally unique identifier based on the first user; cause an encryption of the first data packet using a plurality of encryption keys, wherein at least one of the plurality of encryption keys is based on the universally unique identifier; store at least one of the plurality of encryption keys for the encrypted first data packet on a first distributed ledger subnet of the plurality of distributed ledger subnets, wherein the first distributed ledger subnet is determined based on a data type of the first data packet; receive the at least one of the plurality of encryption keys for the encrypted first data packet stored on the first distributed ledger subnet; and cause a decryption of the first data packet based on the at least one of the plurality of encryption keys for the encrypted first data packet stored on the first distributed ledger subnet.

Clause 62. The system of Clause 61, wherein the data management system further comprises a data management database, wherein the at least one processing device is further configured to store the encrypted first data packet in a data management database.

Clause 63. The system of Clause 61, further comprising a computing device associated with an entity, wherein the at least one processing device is further configured to cause a transmission of the decrypted first data packet to a computing device associated with an entity.

Clause 64. The system of Clause 61, wherein the first distributed ledger subnet is one of a PII subnet, a PHI subnet, or a platform subnet.

Clause 65. The system of Clause 1, wherein the first distributed ledger subnet is determined from the plurality of distributed ledger subnets.

Clause 66. The system of Clause 65, wherein each of the plurality of distributed ledger subnets contains information relating to a different data type.

Clause 67. The system of Clause 61, wherein the at least one processing device is further configured to determine the data type for the first data packet based on the first data packet.

Clause 68. The system of Clause 67, wherein the at least one processing device is further configured to determine the first distributed ledger subnet based on the data type of the first data packet.

Clause 67. The system of Clause 61, wherein the at least one processing device is further configured to generate the universally unique identifier based on the first user.

Clause 69. The system of Clause 61, wherein the at least one processing device is further configured to store the encrypted first data packet in a data management database.

Clause 70. The system of Clause 61, wherein the at least one processing device is further configured to: receive a second data packet associated with the first user; cause an encryption of the second data packet using the plurality of encryption keys, wherein at least one of the plurality of encryption keys is based on the universally unique identifier; and store at least one of the plurality of encryption keys for the encrypted second data packet on a second distributed ledger subnet, wherein the second distributed ledger subnet is determined based on a data type of the second data packet.

Clause 71. The system of Clause 70, wherein the at least one processing device is further configured to: receive the at least one of the plurality of encryption keys for the encrypted second data packet stored on the second distributed ledger subnet; and cause a decryption of the second data packet based on the at least one of the plurality of encryption keys for the encrypted second data packet stored on the second distributed ledger subnet.

Clause 72. The system of Clause 61, wherein the at least one processing device is further configured to: receive a second data packet associated with a second user, wherein the second data packet is assigned a universally unique identifier based on the second user; cause an encryption of the second data packet using a plurality of encryption keys, wherein at least one of the plurality of encryption keys is based on the universally unique identifier based on the second user; and store at least one of the plurality of encryption keys for the encrypted second data packet on the first distributed ledger subnet, wherein the first distributed ledger subnet is determined based on a data type of the second data packet, wherein the second data packet shares the data type with the first data packet.

Clause 73. The system of Clause 72, wherein the at least one processing device is further configured to: receive the at least one of the plurality of encryption keys for the encrypted second data packet stored on the first distributed ledger subnet; and cause a decryption of the second data packet based on the at least one of the plurality of encryption keys for the encrypted second data packet stored on the first distributed ledger subnet.

Clause 74. The system of Clause 65, wherein the at least one processing device is further configured to generate each of a plurality of distributed ledger subnets, wherein each of the plurality of distributed ledger subnet are dedicated to a specific data type.

Clause 75. The system of Clause 61, wherein the at least one processing device is further configured to cause a transmission of the decrypted first data packet to a computing device associated with an entity.

Clause 76. The system of Clause 61, wherein the at least one processing device is further configured to receive a request for the first data packet associated with the first user.

Clause 77. The system of Clause 76, wherein the request for the first data packet associated with the first user is approved by the first user.

Clause 78. The system of Clause 61, wherein the at least one of the plurality of encryption keys for the encrypted first data packet stored on the first distributed ledger subnet is stored as a node on the first distributed ledger subnet.

Clause 79. The system of Clause 78, wherein the at least one of the plurality of encryption keys for the encrypted first data packet stored on the first distributed ledger subnet is the universally unique identifier based on the first user.

Clause 80. The system of Clause 61, wherein the universally unique identifier based on the first user is combined with each of the plurality of encryption keys to generate a decryption key.

Clause 81. The system of Clause 61, wherein a transaction identifier is generated for the first data packet, wherein the transaction identifier is stored on the first distributed ledger subnet.

Now, therefore, the following is claimed:

1. A system for managing health data, comprising:
a data management system, wherein the data management system comprises at least one cloud computing device;
at least one distributed ledger comprising a plurality of distributed ledger subnets, wherein the plurality of distributed ledger subnets is segmented based on data type; and
a network creating a connection between the data management system and the at least one distributed ledger,
wherein the data management system comprises:
at least one non-transitory storage device; and
at least one processing device coupled to the at least one non-transitory storage device, wherein the at least one processing device is configured to:
receive a first data packet associated with a first user, wherein the first data packet is assigned a universally unique identifier based on the first user;
cause an encryption of the first data packet using a plurality of encryption keys, wherein at least one of the plurality of encryption keys is based on the universally unique identifier;
store at least one of the plurality of encryption keys for the encrypted first data packet on a first distributed ledger subnet of the plurality of distributed ledger subnets, wherein the first distributed ledger subnet is determined based on a data type of the first data packet;
receive the at least one of the plurality of encryption keys for the encrypted first data packet stored on the first distributed ledger subnet; and
cause a decryption of the first data packet based on the at least one of the plurality of encryption keys for the encrypted first data packet stored on the first distributed ledger subnet.

2. The system of claim 1, wherein the data management system further comprises a data management database, wherein the at least one processing device is further configured to store the encrypted first data packet in a data management database.

3. The system of claim 1, further comprising a computing device associated with an entity, wherein the at least one processing device is further configured to cause a transmission of the decrypted first data packet to a computing device associated with an entity.

4. The system of claim 1, The system of claim 1, wherein the at least one processing device is further configured to determine the data type for the first data packet based on the first data packet.

5. The system of claim 3, wherein the at least one processing device is further configured to determine the first distributed ledger subnet based on the data type of the first data packet.

6. A system for managing health data, comprising:
at least one non-transitory storage device; and
at least one processing device coupled to the at least one non-transitory storage device, wherein the at least one processing device is configured to:
receive a first data packet associated with a first user, wherein the first data packet is assigned a universally unique identifier based on the first user;
cause an encryption of the first data packet using a plurality of encryption keys, wherein at least one of the plurality of encryption keys is based on the universally unique identifier;
store at least one of the plurality of encryption keys for the encrypted first data packet on a first distributed ledger subnet, wherein the first distributed ledger subnet is determined based on a data type of the first data packet;
receive the at least one of the plurality of encryption keys for the encrypted first data packet stored on the first distributed ledger subnet; and
cause a decryption of the first data packet based on the at least one of the plurality of encryption keys for the encrypted first data packet stored on the first distributed ledger subnet.

7. The system of claim 6, further comprising a plurality of distributed ledger subnets, wherein the first distributed ledger subnet is determined from the plurality of distributed ledger subnets.

8. The system of claim 6, wherein the at least one processing device is further configured to determine the data type for the first data packet based on the first data packet.

9. The system of claim 8, wherein the at least one processing device is further configured to determine the first distributed ledger subnet based on the data type of the first data packet.

10. The system of claim 6, wherein the at least one processing device is further configured to store the encrypted first data packet in a data management database.

11. The system of claim 6, wherein the at least one processing device is further configured to:
receive a second data packet associated with the first user;
cause an encryption of the second data packet using the plurality of encryption keys, wherein at least one of the plurality of encryption keys is based on the universally unique identifier;

store at least one of the plurality of encryption keys for the encrypted second data packet on a second distributed ledger subnet, wherein the second distributed ledger subnet is determined based on a data type of the second data packet;

receive the at least one of the plurality of encryption keys for the encrypted second data packet stored on the second distributed ledger subnet; and cause a decryption of the second data packet based on the at least one of the plurality of encryption keys for the encrypted second data packet stored on the second distributed ledger subnet.

12. The system of claim 6, wherein the at least one processing device is further configured to:

receive a second data packet associated with a second user, wherein the second data packet is assigned a universally unique identifier based on the second user;

cause an encryption of the second data packet using a plurality of encryption keys, wherein at least one of the plurality of encryption keys is based on the universally unique identifier based on the second user; and store at least one of the plurality of encryption keys for the encrypted second data packet on the first distributed ledger subnet, wherein the first distributed ledger subnet is determined based on a data type of the second data packet, wherein the second data packet shares the data type with the first data packet.

13. The system of claim 6, wherein the at least one processing device is further configured to cause a transmission of the decrypted first data packet to a computing device associated with an entity.

14. The system of claim 6, wherein the at least one processing device is further configured to receive a request for the first data packet associated with the first user.

15. The system of claim 6, wherein the at least one of the plurality of encryption keys for the encrypted first data packet stored on the first distributed ledger subnet is stored as a node on the first distributed ledger subnet.

16. A method for managing health data, comprising:

receiving a first data packet associated with a first user, wherein the first data packet is assigned a universally unique identifier based on the first user;

causing an encryption of the first data packet using a plurality of encryption keys, wherein at least one of the plurality of encryption keys is based on the universally unique identifier;

storing at least one of the plurality of encryption keys for the encrypted first data packet on a first distributed ledger subnet, wherein the first distributed ledger subnet is determined based on a data type of the first data packet;

receiving the at least one of the plurality of encryption keys for the encrypted first data packet stored on the first distributed ledger subnet; and causing a decryption of the first data packet based on the at least one of the plurality of encryption keys for the encrypted first data packet stored on the first distributed ledger subnet.

17. The method of claim 16, wherein the first distributed ledger subnet is determined from a plurality of distributed ledger subnets.

18. The method of claim 16, further comprising determining the data type for the first data packet based on the first data packet.

19. The method of claim 18, further comprising determining the first distributed ledger subnet based on the data type of the first data packet.

20. The method of claim 16, further comprising storing the encrypted first data packet in a data management database.

* * * * *